(12) United States Patent
Mizobuchi

(10) Patent No.: US 11,659,268 B2
(45) Date of Patent: May 23, 2023

(54) IMAGING APPARATUS CAPABLE OF AUTOMATICALLY CAPTURING IMAGE, CONTROL METHOD, AND RECORDING MEDIUM

(71) Applicant: CANON KABUSHIKI KAISHA, Tokyo (JP)

(72) Inventor: Yasuhiro Mizobuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/466,609

(22) Filed: Sep. 3, 2021

(65) Prior Publication Data

US 2022/0094843 A1 Mar. 24, 2022

(30) Foreign Application Priority Data

Sep. 24, 2020 (JP) .............................. JP2020-160151

(51) Int. Cl.
| | | |
|---|---|---|
| *H04N 23/611* | (2023.01) | |
| *G06V 40/50* | (2022.01) | |
| *G06V 40/16* | (2022.01) | |
| *H04N 23/68* | (2023.01) | |
| *H04N 23/695* | (2023.01) | |

(52) U.S. Cl.
CPC ......... *H04N 23/611* (2023.01); *G06V 40/172* (2022.01); *G06V 40/50* (2022.01); *H04N 23/687* (2023.01); *H04N 23/6812* (2023.01); *H04N 23/695* (2023.01)

(58) Field of Classification Search
CPC ........... H04N 5/23219; H04N 5/23218; H04N 23/611; H04N 23/61
See application file for complete search history.

(56) References Cited

U.S. PATENT DOCUMENTS

| | | | | |
|---|---|---|---|---|
| 8,488,847 | B2* | 7/2013 | Nozaki | .............. H04N 5/23219 |
| | | | | 348/240.99 |
| 8,797,442 | B2* | 8/2014 | Lee | .................... H04N 5/23218 |
| | | | | 348/333.03 |
| 9,053,368 | B2* | 6/2015 | Chou | .................. H04N 1/00172 |
| 9,087,237 | B2* | 7/2015 | Shimizu | ............... G06K 9/6217 |
| 2009/0135269 | A1* | 5/2009 | Nozaki | .............. H04N 5/23219 |
| | | | | 348/222.1 |
| 2012/0086834 | A1* | 4/2012 | Adachi | ................... G06T 11/00 |
| | | | | 348/E5.051 |

(Continued)

FOREIGN PATENT DOCUMENTS

| | | | | | |
|---|---|---|---|---|---|
| JP | 2010259088 | A | * | 11/2010 | ......... H04N 1/00249 |
| JP | 2020092354 | A | | 6/2020 | |
| KR | 20150029230 | A | * | 3/2015 | ......... H04N 5/23219 |

*Primary Examiner* — John Villecco

(74) *Attorney, Agent, or Firm* — Canon U.S.A., Inc. IP Division

(57) ABSTRACT

An imaging apparatus includes an imaging unit, a control unit configured to control the imaging unit to automatically capture an image, a registration unit configured to register a subject, and an association unit configured to associate the subject registered by the registration unit with a specific date. The control unit performs control so that a subject registered by the registration unit, with which the date associated by the association unit is the current day, is to be preferentially captured over a subject with which the date associated by the association unit is not the current day or no date is associated by the association unit.

7 Claims, 17 Drawing Sheets

(56) References Cited

U.S. PATENT DOCUMENTS

| | | | |
|---|---|---|---|
| 2013/0050461 A1* | 2/2013 | Wada | G06V 40/172 |
| | | | 348/E7.085 |
| 2013/0169839 A1* | 7/2013 | Takahashi | H04N 5/772 |
| | | | 348/231.99 |
| 2013/0251198 A1* | 9/2013 | Shimizu | G06K 9/6217 |
| | | | 382/103 |
| 2019/0342491 A1* | 11/2019 | Mandavilli | H04N 5/23219 |
| 2022/0132023 A1* | 4/2022 | Kagaya | G06V 40/50 |

* cited by examiner

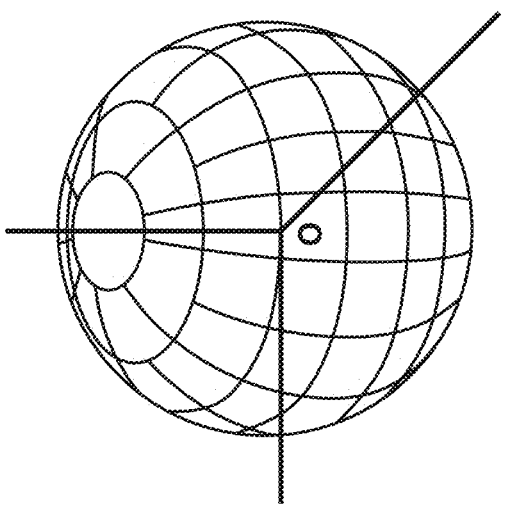
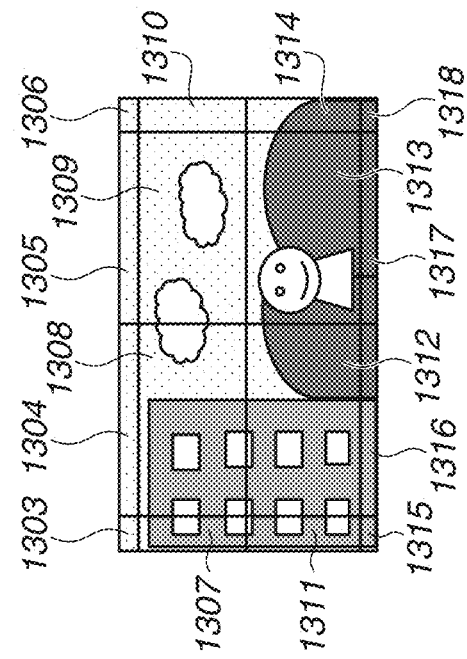
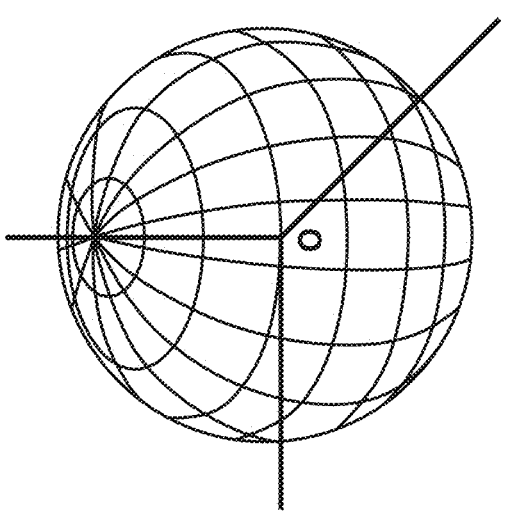
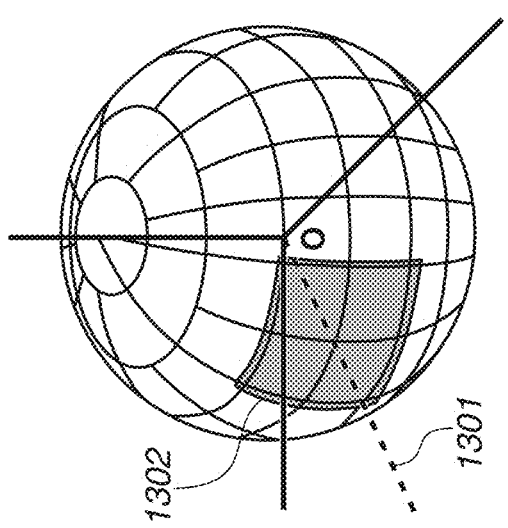

FIG.11

| SUBJECT NUMBER | PRIORITY SETTING | NAME | BIRTHDAY |
|---|---|---|---|
| 1 | PRIORITY | AIRI | APR. 12, 1994 |
| 2 | NON-PRIORITY | MOMOKO | MAR. 6, 1992 |
| 3 | NON-PRIORITY | MIYABI | AUG. 25, 1992 |
| ⋮ | ⋮ | ⋮ | ⋮ |

IMAGING APPARATUS CAPABLE OF AUTOMATICALLY CAPTURING IMAGE, CONTROL METHOD, AND RECORDING MEDIUM

BACKGROUND

Field of the Disclosure

The present disclosure relates to an imaging apparatus capable of automatically capturing an image.

Description of the Related Art

In recent years, an automatic image capturing camera that periodically and continuously capture an image without using an image capturing instruction from a user, has been known. For example, Japanese Patent Application Laid-Open No. 2020-92354 discusses an apparatus that has a pan/tilt mechanism and is capable of automatically searching for a subject and automatically capturing an image of the subject. The conventional technique discussed in Japanese Patent Application Laid-Open No. 2020-92354 determines which person or scene is to be captured based on the facial expression and voice volume of each person through an importance setting. However, the conventional technique does not consider important days for each person, such as the birthday, at all. It is generally assumed that many users want a camera to preferentially capture an image of a person related to an important day such as the birthday and wedding anniversary. However, the conventional technique does not notice such a user's intention and therefore has not necessarily been able to perform automatic image capturing based on the user's intention.

SUMMARY

According to an aspect of the present disclosure, an imaging apparatus includes an imaging unit, a control unit configured to control the imaging unit to automatically capture an image, a registration unit configured to register a subject, and an association unit configured to associate the subject registered by the registration unit with a specific date. The control unit performs control so that a subject registered by the registration unit, with which the date associated by the association unit is the current day, is to be preferentially captured over a subject with which the date associated by the association unit is not the current day or no date is associated by the association unit.

Further features of the present disclosure will become apparent from the following description of exemplary embodiments with reference to the attached drawings.

BRIEF DESCRIPTION OF THE DRAWINGS

FIGS. 8A, 8B, 8C, and 8D illustrate area division in a captured image according to one or more aspects of the presently disclosure.

FIG. 11 is a table illustrating subject information according to one or more aspects of the presently disclosure.

DESCRIPTION OF THE EMBODIMENTS

Exemplary embodiments of the present disclosure will be described in detail below with reference to the accompanying drawings.

The following exemplary embodiments are to be considered as illustrative examples for achieving the present disclosure, and may be corrected, modified, and combined as required depending on the configuration of an apparatus according to the present disclosure and other various conditions.

Figure 1A:
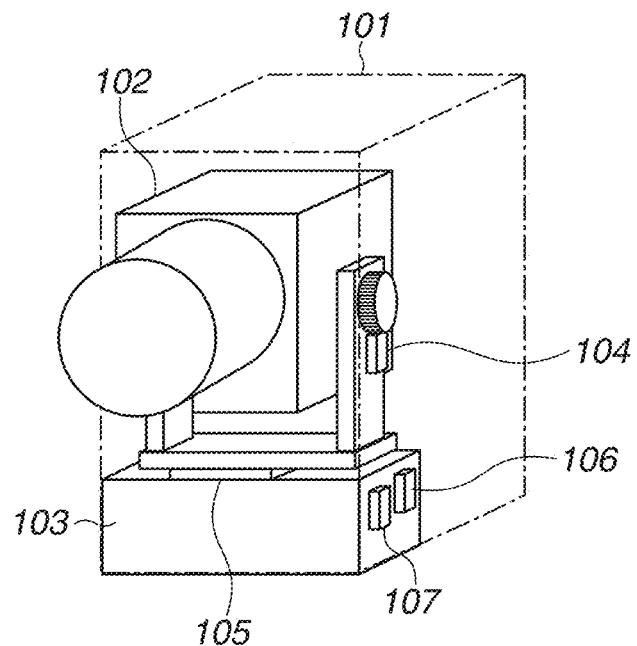
FIG. 1A illustrates an example of an outer appearance of an imaging apparatus.
Figure 1B:
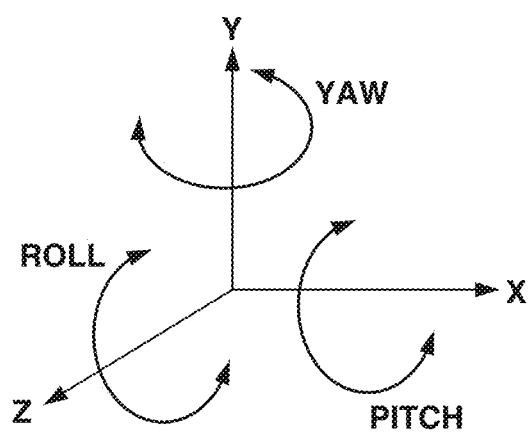
FIG. 1B illustrates an operation of the imaging apparatus, according to one or more aspects of the presently disclosure.

FIGS. 1A and 1B schematically illustrate an imaging apparatus according to a first exemplary embodiment.

Referring to FIG. 1A, an imaging apparatus 101 is provided with an operation member for operating the power switch (hereinafter referred to as a power button). The power button may be replaced with an operation such as a tap, flick, or swipe. The imaging apparatus 101 is provided with a lens barrel 102 as a housing that includes a lens group and an image sensor for capturing an image. The lens barrel 102 is provided with a rotation mechanism that drives the lens barrel 102 to rotate with respect to a fixed portion 103. A tilt rotation unit 104 is a motor drive mechanism that enables rotating the lens barrel 102 in the pitch direction illustrated in FIG. 1B. A pan rotation unit 105 is a motor drive mechanism that enables rotating the lens barrel 102 in the yaw direction in FIG. 1B. This means that the lens barrel 102 can rotate in more than one direction. FIG. 1B illustrates axis definitions at the position of the fixed portion 103. Both an angular velocity meter 106 and an accelerometer 107 are mounted at the fixed portion 103 of the imaging apparatus 101. The imaging apparatus 101 detects vibration of the imaging apparatus 101 by using the angular velocity meter 106 and the accelerometer 107, and drives the tilt rotation unit 104 and the pan rotation unit 105 to rotate based on the detected shake angle. The imaging apparatus 101 is configured to correct the shake and inclination of the lens barrel 102 as a moving unit.

Figure 2:
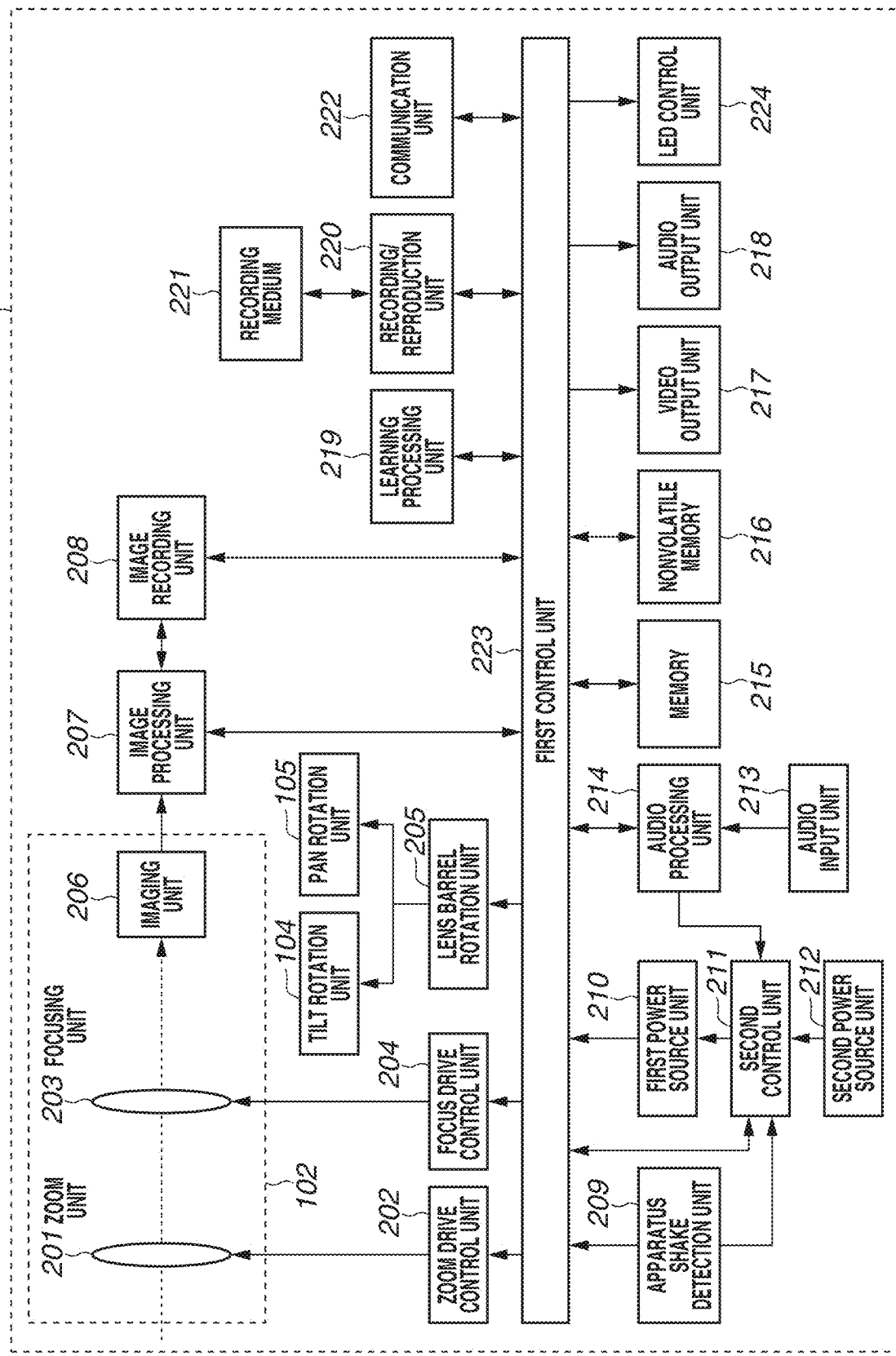
FIG. 2 is a block diagram illustrating a configuration of the imaging apparatus according to one or more aspects of the presently disclosure.

FIG. 2 is a block diagram illustrating a configuration of the imaging apparatus 101 according to the first exemplary embodiment.

Referring to FIG. 2, a first control unit 223 includes a processor (e.g., central processing unit (CPU), graphics processing unit (GPU), microprocessor, and micro processing unit (MPU)), and a memory (e.g., a dynamic random access memory (DRAM) and a static random access memory (SRAM)). These devices perform various processing to control each block of the imaging apparatus 101 and control data transmission between blocks. A nonvolatile memory (electrically erasable programmable read only memory (EEPROM)) 216 stores constants and programs for operations of the first control unit 223.

Referring to FIG. 2, a zoom unit 201 includes a zoom lens that performs magnification. A zoom drive control unit 202 drives and controls the zoom unit 201. A focusing unit 203 includes a lens for performing focus adjustment. A focus drive control unit 204 drives and controls the focusing unit 203.

In an imaging unit 206, the image sensor receives incident light through each lens group and outputs electric charge information corresponding to the light quantity as analog image data, to an image processing unit 207. The image processing unit 207 applies image processing such as distortion correction, white balance adjustment, and color interpolation processing to digital image data output through analog-to-digital (A/D) conversion, and outputs the digital image data after the application. The digital image data output from the image processing unit 207 is converted into a recording format such as a Joint Photographic Experts Group (JPEG) format by an image recording unit 208, and then transmitted to a memory 215 and a video output unit 217 (described below).

A lens barrel rotation drive unit 205 drives the tilt rotation unit 104 and the pan rotation unit 105 to drive the lens barrel 102 in the tilt and pan directions, respectively.

An apparatus shake detection unit 209 mounts, for example, the angular velocity meter (gyro sensor) 106 that detects the angular velocity in the 3-axis directions of the imaging apparatus 101, and the accelerometer (acceleration sensor) 107 that detects the acceleration in the 3-axis directions of the imaging apparatus 101. The apparatus shake detection unit 209 calculates the rotational angle and shift amount of the imaging apparatus 101 based on detected signals.

An audio input unit 213 acquires an audio signal collected from around the imaging apparatus 101 by using a microphone provided on the imaging apparatus 101, performs analog-to-digital conversion on the audio signal to, and transmits the digitalized signal to an audio processing unit 214. The audio processing unit 214 performs optimization processing and other audio processing on the input digital audio signal. The audio signal processed by the audio processing unit 214 is transmitted to the memory 215 by the first control unit 223. The memory 215 temporarily stores an image signal and an audio signal obtained by the image processing unit 207 and the audio processing unit 214, respectively.

The image processing unit 207 and the audio processing unit 214 read the image signal and the audio signal, temporarily stored in the memory 215, and encode the image signal and the audio signal to generate compressed image signal and compressed audio signal, respectively. The first control unit 223 transmits the compressed image signal and the compressed audio signal to a recording/reproduction unit 220.

The recording/reproduction unit 220 records in a recording medium 221 the compressed image signal and the compressed audio signal generated by the image processing unit 207 and the audio processing unit 214, respectively, and other imaging control data. When the audio signal is not to be compressed or encoded, the first control unit 223 transmits the audio signal generated by the audio processing unit 214 and the compressed image signal generated by the image processing unit 207 to the recording/reproduction unit 220, and causes the recording/reproduction unit 220 to record these signals in the recording medium 221.

The recording medium 221 may be a recording medium built-in the imaging apparatus 101 or a removable recording medium. The recording medium 221 can record various types of data such as the compressed image signal, the compressed audio signal, and the audio signal generated by the imaging apparatus 101. Thus, a medium having a larger capacity than the nonvolatile memory 216 is generally used. For example, the recording medium 221 includes a hard disk, optical disk, magneto-optical disk, compact disc recordable (CD-R), digital versatile disc recordable (DVD-R), magnetic tape, nonvolatile semiconductor memory, flash memory, and other recording media of all types.

The recording/reproduction unit 220 reads out (reproduces) the compressed image signal, the compressed audio signal, the audio signal, various types of data, and programs recorded in the recording medium 221. The first control unit 223 transmits the read compressed image signal and the read compressed audio signal to the image processing unit 207 and the audio processing unit 214, respectively. The image processing unit 207 and the audio processing unit 214 temporarily store the compressed image signal and the compressed audio signal in the memory 215, respectively, decodes these signals in a predetermined procedure, and transmit the decoded signals to the video output unit 217 and the audio output unit 218.

The audio input unit 213 is used to acquire audio signals through a plurality of microphones on the imaging apparatus 101. The audio processing unit 214 detects the sound direction on the plane where the microphones are installed and is used for search and automatic image capturing (described below). The audio processing unit 214 further detects specific audio commands. Some of audio commands are pre-registered commands. The user may be able to register specific sounds in the imaging apparatus 101 as audio commands. The audio processing unit 214 also performs sound scene recognition. In the sound scene recognition, the audio processing unit 214 determines a sound scene by using a learned model that completed machine learning based on a large amount of audio data. Specific machine learning algorithms include the nearest neighbor method, naive Bayes method, decision tree, and support vector machine. Specific machine learning algorithms also include the deep learning that automatically generates feature quantities and binding weighting coefficients for learning by using a neural network. Any one of the above-described usable algorithms can be applied to the present exemplary embodiment as required.

According to the present exemplary embodiment, a neural network for detecting specific scenes, such as "Cheering" "Clapping" and "Uttering", is set in the audio processing unit 214. The audio processing unit 214 is configured to output a detection trigger signal to the first control unit 223 and a second control unit 211 upon detection of a specific sound scene or a specific audio command.

More specifically, the neural network of the audio processing unit 214 prepares audio information for "Cheering", "Clapping", and "Uttering" scenes and performs learning by using the audio information as an input and the detection trigger signal as an output.

The second control unit 211, provided separately from the first control unit 223 that controls the entire main system of the imaging apparatus 101, controls the power supply to the first control unit 223.

The first power source unit 210 and the second power source unit 212 supply power to operate the first control unit 223 and the second control unit 211, respectively. When the power button on the imaging apparatus 101 is pressed, power is supplied to both the first control unit 223 and the second control unit 211. As described below, the first control unit 223 is controlled to turn OFF the power supply from the first control unit 223 itself to the first power source unit 210. Even while the operation of the first control unit 223 is not operating, the second control unit 211 is operating to receive information from the apparatus shake detection unit 209 and the audio processing unit 214. The second control unit 211 performs processing for determining whether to activate the first control unit 223 based on various input information. When the second control unit 211 determines to activate the first control unit 223, the second control unit 211 issues a power supply instruction to the first power source unit 210. According to the present exemplary embodiment, the first and the second power source units 210 and 212 supply power from a battery. More specifically, the imaging apparatus 101 is also a portable terminal.

The audio output unit 218 outputs, for example, a preset audio pattern from a built-in speaker of the imaging apparatus 101 during image capturing.

A light emitting diode (LED) control unit 224 controls, for example, a preset lighting/blinking pattern of the LED provided on the imaging apparatus 101 during image capturing.

The video output unit 217 includes, for example, a video out terminal, and transmits an image signal to display a video image on a connected external display. The audio output unit 218 and the video output unit 217 may be one combined terminal such as a High-Definition Multimedia Interface (HDMI®) terminal.

A communication unit 222 performs communication transmission and reception of such data as an audio signal, image signal, compressed audio signal, and compressed image signal between the imaging apparatus 101 and an external apparatus. The communication unit 222 also receives image capturing control signals including image capturing start and end commands, and the pan drive, tilt drive, and zoom drive, and drives the imaging apparatus 101 based on an instruction from an external apparatus capable of communicating with the imaging apparatus 101. Information such as various parameters related to the learning to be processed by the learning processing unit 219 (described below) is transmitted and received between the imaging apparatus 101 and an external apparatus. Examples of the communication unit 222 include an infrared communication module, Bluetooth® communication module, wireless local area network (LAN) communication module, and wireless Universal Serial Bus (USB), Global Positioning System (GPS) receiver, and other wireless communication modules.

<System Configuration with External Communication Apparatus>

Figure 3:
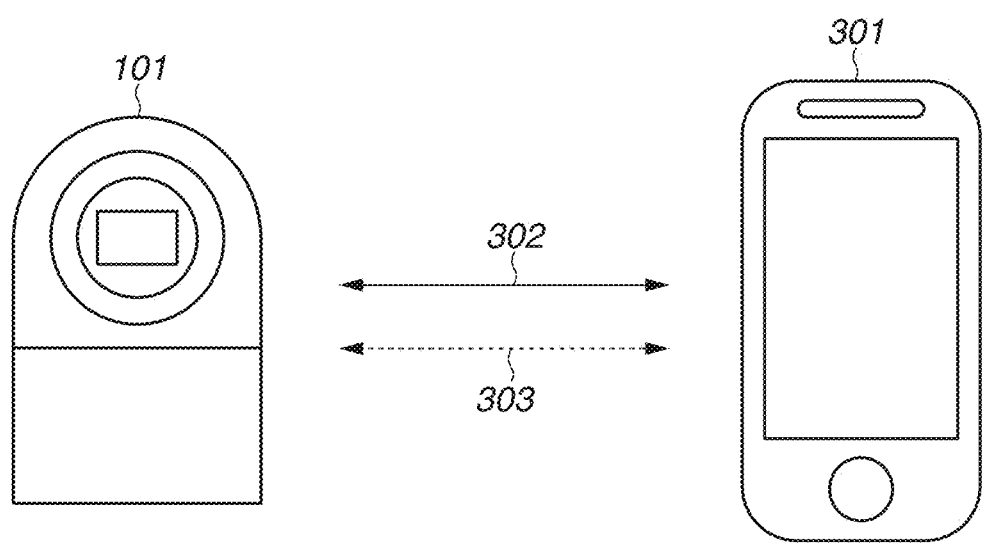
FIG. 3 illustrates configurations of the imaging apparatus and an external apparatus according to one or more aspects of the presently disclosure.

FIG. 3 illustrates an example configuration of a wireless communication system between the imaging apparatus 101 and an external apparatus smart device 301. The imaging apparatus 101 is a digital camera having an image capturing function, and the external apparatus 301 (hereinafter, referred to as a smart device 301) is a smart device including a Bluetooth communication module and a wireless LAN communication module.

The imaging apparatus 101 and the smart device 301 are capable of communicating with each other through communication 302 based on a wireless LAN conforming to the Institute of Electrical and Electronics Engineers (IEEE) 802.11 standard series, and communication 303 having a master-slave relation between a control station and a slave station, such as Bluetooth® Low Energy (hereinafter referred to as BLE). The wireless LAN and BLE are examples of communication methods. Each communication apparatus has at least two different communication functions. In communication based on the relation between a control station and a slave station, other communication methods may be used as long as one communication function can control the other communication function. Without losing generality, it is assumed that the first communication such as a wireless LAN enables communication at higher communication rates than the second communication such as BLE, and that the second communication provides at least either one of a lower power consumption and a shorter communicable distance than the first communication.

<Configuration of External Communication Apparatus>

Figure 4:
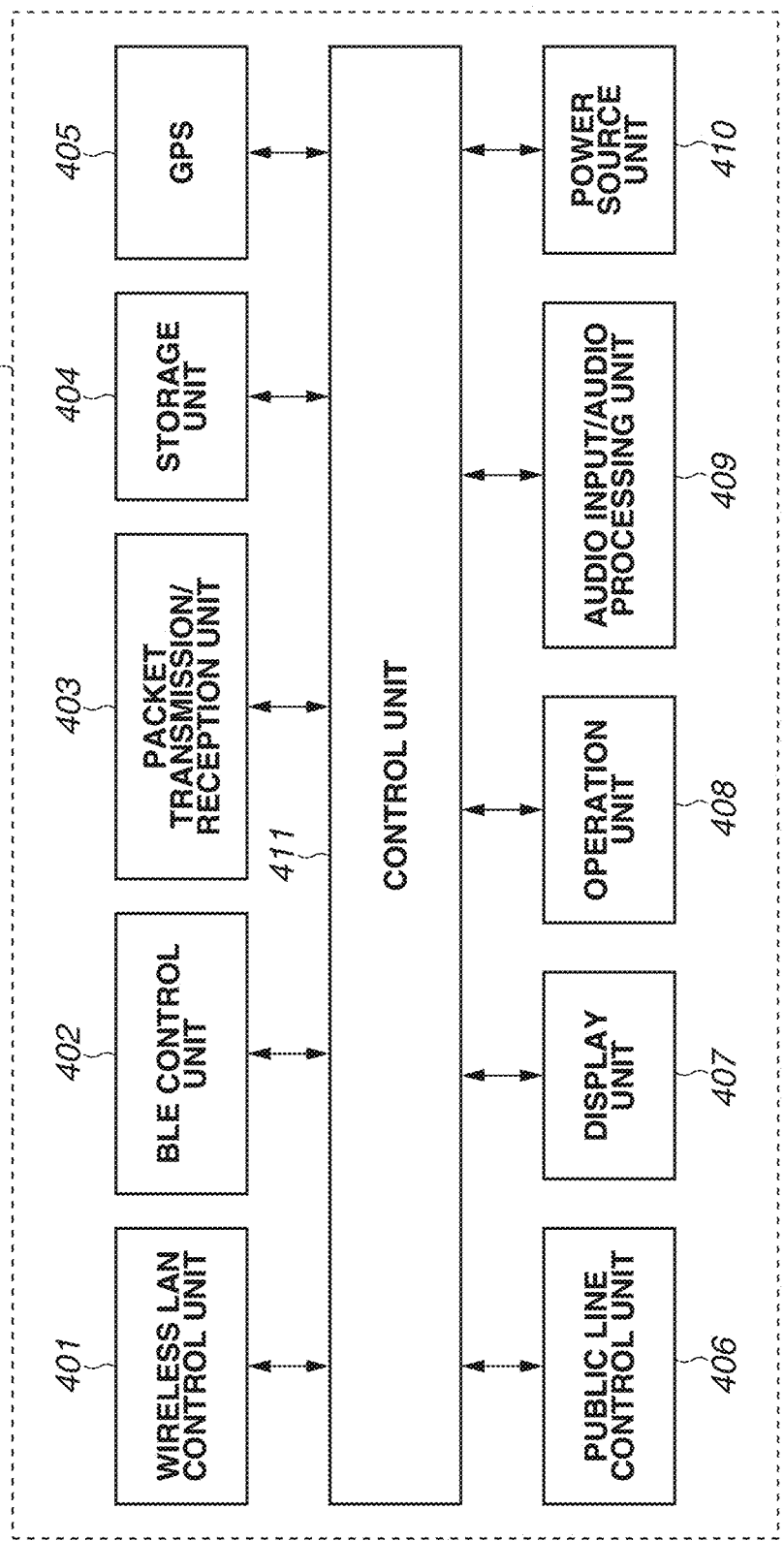
FIG. 4 is a block diagram illustrating the configuration of the external apparatus according to one or more aspects of the presently disclosure.

The configuration of the smart device 301 as an example of an external communication apparatus will be described with reference to FIG. 4. The smart device 301 is what is called a portable phone, i.e., a portable terminal.

The smart device 301 includes, for example, a public communication line control unit 406 for public wireless communication in addition to a wireless LAN control unit 401 for wireless LAN and a BLE control unit 402 for BLE. The smart device 301 further includes a packet transmission/reception unit 403. The wireless LAN control unit 401 performs protocol processing related to Radio Frequency (RF) control on a wireless LAN, communication processing, drivers performing various control on wireless LAN communication conforming to the IEEE 802.11 standard series, and wireless LAN communication. The BLE control unit 402 performs protocol processing related to RF control for BLE, communication processing, drivers performing various control in BLE communication, and BLE communication. The public communication line control unit 406 performs protocol processing related to RF control on public wireless communication, communication processing, drivers performing various control on public wireless communication, and public wireless communication. The public wireless communication conforms to, for example, the International Multimedia Telecommunication (IMT) standard and the Long Term Evolution (LTE) standard. The packet transmission/reception unit 403 performs processing for at least either one of packet transmission and reception related to a wireless LAN, BLE communication, and public wireless communication. The present exemplary embodiment will be described on the premise that the smart device 301 performs at least either one of transmission and reception of packets in communication. However, communication formats other than packet switching, such as line switching, are also applicable.

The smart device 301 further includes, for example, a control unit 411, a storage unit 404, a Global Positioning System (GPS) reception unit 405, a display unit 407, an operation unit 408, an audio input/audio processing unit 409, and a power source unit 410. The control unit 411 controls the entire smart device 301 by executing a control program stored in the storage unit 404. The storage unit 404 stores, for example, the control program to be executed by the control unit 411 and various information such as parameters required for communication. Various operations (described below) are implemented when the control unit 411 executes a control program stored in the storage unit 404.

The power source unit 410 supplies power to the smart device 301. The display unit 407 has a function of outputting information that can be visually recognized by using a liquid crystal display (LCD) and an LED or outputting sound by using a speaker, and displays various information. The operation unit 408 includes, for example, buttons that receive user's operations on the smart device 301. The display unit 407 and the operation unit 408 may be configured by a common member, such as a touch panel.

The audio input/audio processing unit 409 may be configured to acquire the user's voice from a general-purpose microphone built in the smart device 301, and acquire a user's operation instruction through speech recognition processing.

The audio input/audio processing unit 409 also acquires an audio command by the user's voice via a dedicated application in the smart device 301. The audio input/audio processing unit 409 can register the audio command as a specific audio command for instructing the audio processing unit 214 of the imaging apparatus 101 to recognize a specific audio command via the communication 302 by a wireless LAN.

A GPS reception unit 405 receives a GPS signal transmitted from a satellite and analyzes the GPS signal to estimate the current position (longitude and latitude information) of the smart device 301. Alternatively, the GPS reception unit 405 may estimate the current position of the smart device 301 based on information obtained from surrounding wireless networks by using a Wi-Fi Positioning System (WPS). When the acquired current GPS position information indicates position within a preset position range (within a predetermined radial range), the smart device 301 notifies the imaging apparatus 101 of movement information via the BLE control unit 402 for use as parameters for the automatic image capturing and automatic editing (described below). On the other hand, when the GPS position information indicates a predetermined position change or larger, the smart device 301 notifies the imaging apparatus 101 of movement information via the BLE control unit 402 for use as parameters for the automatic image capturing and automatic editing (described below).

As described above, the smart device 301 exchanges data with the imaging apparatus 101 in communication via the wireless LAN control unit 401 and the BLE control unit 402. For example, the smart device 301 transmits and receives data such as an audio signal, image signal, compressed audio signal, and compressed image signal. The smart device 301 also issues an image capturing instruction and other operation instructions, transmits audio command registration data, and issues a predetermined position detection notification and a location movement notification based on the GPS position information. The smart device 301 also transmits and receives data for learning via a dedicated application in the smart device 301.

<Image Capturing Operation Sequence>

Figure 5:
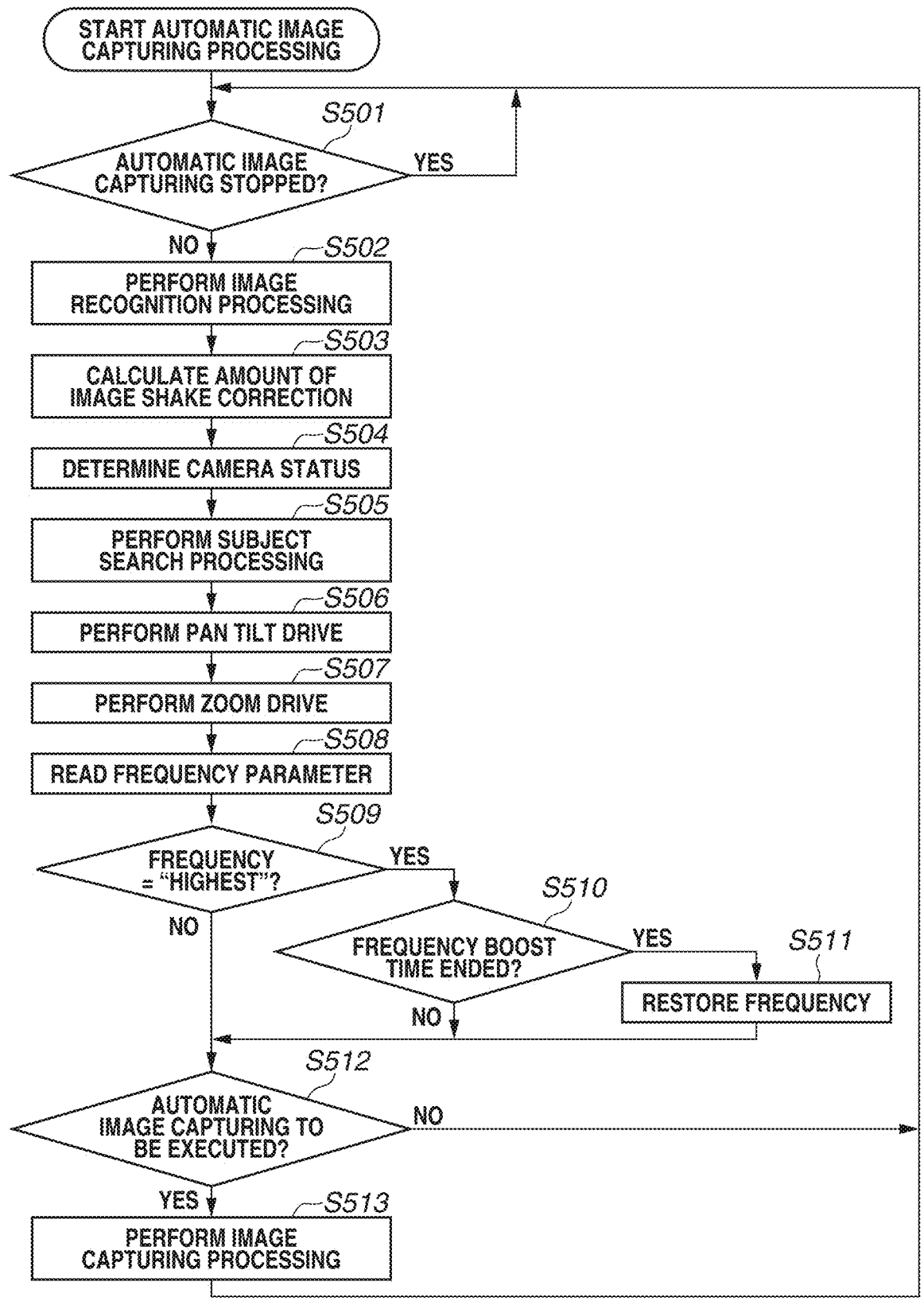
FIG. 5 is a flowchart illustrating automatic image capturing processing according to one or more aspects of the presently disclosure.

FIG. 5 is a flowchart illustrating automatic image capturing processing of the imaging apparatus 101 according to the present exemplary embodiment.

When the user operates the power button provided on the imaging apparatus 101, the processing of the flowcharts starts. According to the present exemplary embodiment, a wireless communication connection is constantly established between the imaging apparatus 101 and the smart device 301, and various operations can be performed from a dedicated application on the smart device 301. Processing of each step in the flowchart is implemented by the first control unit 223 controlling each unit of the imaging apparatus 101.

In step S501, the first control unit 223 determines whether the automatic image capturing is currently being stopped. Stopping the automatic image capturing will be described below with reference to the flowchart of the speech recognition processing. When the automatic image capturing is being stopped (YES in step S501), the first control unit 223 waits, without performing any processing, until the stop of the automatic image capturing is canceled. On the other hand, when the automatic image capturing is not being stopped (NO in step S501), the processing proceeds to step S502. In step S502, the first control unit 223 performs image recognition processing.

In step S502, the first control unit 223 causes the image processing unit 207 to perform image processing on the signal captured by the imaging unit 206 to generate an image for subject recognition.

The image processing unit 207 performs subject recognition such as person and object recognitions based on the generated image.

When recognizing a person, the image processing unit 207 detects the face and body of the subject. In face detection processing, predefined patterns used for determining a person's face make it possible to detect positions that coincide with the patterns included in the captured image as a face image of the person.

The image processing unit 207 also calculates the reliability indicating the probability as the subject's face at the same time. The reliability is calculated based on, for example, the size of the face region in the image and the degree of matching with the face patterns.

Also in the object recognition, an object that matches a pre-registered patterns can be recognized.

There is also a method of extracting a feature subject by using a histogram of the hue or saturation in the captured image. In this case, for the image of a subject captured in the imaging angle of view, the first control unit 223 divides the distribution derived from the histogram of the hue or saturation into a plurality of sections, and classifies images captured for respective sections.

For example, a histogram having a plurality of color components is generated for the captured image. Then, the histogram is divided in the mound-like distribution range, and the captured images are classified in a region belonging to a combination in the same section. Then, image regions of the subject are recognized.

By calculating an evaluation value for each image region of the recognized subject, the image region of the subject having the highest evaluation value can be determined as the main subject region.

The above-described method enables obtaining each piece of subject information from imaging information.

In step S503, the first control unit 223 calculates the amount of the image shake correction. More specifically, the first control unit 223 calculates the absolute angle of the imaging apparatus 101 based on the angular velocity acquired by the apparatus shake detection unit 209 and acceleration information. Then, the first control unit 223 obtains the image stabilization angle for moving the tilt rotation unit 104 and the pan rotation unit 105 in the angular direction for canceling the absolute angle, and determines the image stabilization angle as the amount of the image shake correction. For this processing for calculating the amount of the image shake correction, the calculation method can be changed through learning processing (described below).

In step S504, the first control unit 223 determines the status of the imaging apparatus 101. The first control unit 223 determines the current vibration and moving state of the imaging apparatus 101 based on the angle and moving amount detected based on the angular velocity information, acceleration information, and GPS position information.

For example, when the imaging apparatus 101 is attached to an automobile to capture an image, the subject information such as surrounding scenery is largely changed by the moving distance.

This enables the first control unit 223 to determine whether the current state is "Vehicle Moving State" where the imaging apparatus 101 is attached to an automobile and is moving at a high speed. This state can be used for automatic subject search (describe below).

The first control unit 223 determines whether the angle largely changes to determine whether the current state is "Stationary Image Capturing State" where the imaging apparatus 101 has almost no shake angle.

In the "Stationary Image Capturing State", since the imaging apparatus 101 itself is considered to have no angular change, it is possible to perform subject search for stationary image capturing.

When the angular change is comparatively large, the first control unit 223 determines "Hand-held Image Capturing State", and it is possible to perform the subject search for hand-held image capturing.

In step S505, the first control unit 223 performs the subject search processing. The subject search includes the following processing:

(1) Area Division

Area division will be described with reference to FIGS. 8A, 8B, 8C, and 8D. As illustrated in FIG. 8A, the area division is performed over the entire circumference centering on the position of the imaging apparatus 101 (origin O is assumed to be the position of the imaging apparatus 101). In the example in FIG. 8A, the area division is performed at intervals of 22.5 degrees in each of the tilt and pan directions. In the area division in FIG. 8A, with the increasing angle in the tilt direction from 0 degrees, the horizontal circumference decreases to decrease the area region. For this reason, in the imaging apparatus 101 according to the present exemplary embodiment, the area range is set to more than 22.5 degrees when the tilt angle is 45 degrees or more, as illustrated in FIG. 8B. FIGS. 8C and 8D illustrate an example of the area division in the imaging angle of view. An axis 1301 is the orientation of the imaging apparatus 101 at the time of initialization. The area division is performed by using this directional angle as a reference position. FIG. 8D illustrates an example of an image captured in an angle of view area 1302. In the image captured in the angle of view, the image division is performed based on the area division as illustrated in division areas 1303 to 1318 in FIG. 8D.

(2) Calculating Importance Level for Each Area

For each division area made as described above, the importance level indicating the priority order in performing search is calculated based on subjects existing in the area and the scene status in the area. The importance level based on the subject state is calculated, for example, based on the number of persons in the area, the face size and orientation of each person, the probability of face detection, and the facial expression, and personal authentication result for each person. Examples of importance levels based on the scene status include a general object recognition result, scene determination result (e.g., blue sky, backlight, and evening view), sound level and speech recognition result from the area direction, and information about movement detection in the area. In the determination of state of the imaging apparatus 101 in step S504, the vibration state of the imaging apparatus 101 is detected, and the importance level may be made changeable based on the vibration state. For example, when the current state is determined to be "Stationary Image Capturing State", the importance level is determined to be high when the face authentication of a specific person is detected so that the subject search is performed among subjects having high priority (e.g., user of the imaging apparatus 101) registered in the face authentication. Further, the automatic image capturing (described below) is also performed in priority of the face. Even if the user of the imaging apparatus 101 brings the imaging apparatus 101 and performs imaging over a long time, the user can record many images including the user by removing the imaging apparatus 101 and placing it on a desk or the like. Since the subject search can be performed through the pan/tilt operation in this case, the user can record images including the user and group photos including many faces simply by suitably setting the imaging apparatus 101 without considering the setting angle of the imaging apparatus 101. Only under the above-described condition, the area having the highest importance level remains unchanged as long as each area remains unchanged. As a result, the area subjected to search will remain unchanged. For this reason, the importance level is changed based on the past imaging information. More specifically, the importance level may be reduced for the area that has been specified as the search area for a predetermined time period continuously, or the importance level may be reduced for a predetermined time period for the area where image capturing was performed in step S513 (described below).

(3) Determining Search Target Area

When the importance level for each area is calculated as described above, the area having a high importance level is determined as the search target area, and then the pan/tilt search target angle required to grasp the search target area in the angle of view is calculated.

In step S506, the first control unit 223 performs the pan/tilt drive. More specifically, the first control unit 223 adds the drive angle in control sampling based on the amount of the image shake correction and the pan/tilt search target angle to calculate the amount of the pan/tilt drive. Then, the lens barrel rotation drive unit 205 controls the drive of the tilt rotation unit 104 and the pan rotation unit 105.

In step S507, the first control unit 223 controls the zoom unit 201 to perform the zoom drive. More specifically, the first control unit 223 performs the zoom drive based on the status of the search target subject determined in step S505.

For example, if a person's face as the search target subject is too small, i.e., smaller than the minimum detectable size, the face cannot be detected or possibly be missing. In such a case, the first control unit 223 performs control to increase the face size in the image by zooming the image on the telephoto side. On the other hand, if the face of a person is too large in the image, the subject is likely to be out of the angle of view by the movement of the subject or the imaging apparatus 101 itself. In such a case, the first control unit 223 performs control to reduce the face size on the screen by zooming in the wide-angle direction. Performing zoom control in this way enables maintaining the subject in a state suitable for tracking.

While, in steps S505 to S507, the first control unit 223 performs the subject search through the pan/tilt and zoom drive, the subject search may be performed through an imaging system that captures images in all directions at one time by using a plurality of wide-angle lenses. With an omni-directional camera, an enormous amount of processing is required for image processing such as subject detection by using all of signals obtained in image capturing as an input image. Thus, the first control unit 223 is configured to clip a part of the image and then perform the subject search processing within the range of the clipped image. The first control unit 223 calculates the important level for each area like the above-described method, changes the clipping position based on the important level, and determines the automatic image capturing (described below). This enables reducing the power consumption by image processing and performing the high-speed subject search.

In step S508, the first control unit 223 reads a frequency parameter as a setting value that indicates the easiness of the automatic image capturing. The user can set the frequency parameter to an arbitrary frequency, i.e., select the frequency from the "Low", "Medium", and "High" options via a dedicated application of the smart device 301. Setting the frequency parameter to "High" enables capturing a larger number of images in a predetermined time period than the number of captured images when the frequency parameter is set to "Low". The number of captured images when the frequency parameter is set to "Medium" is between the number of captured images when the frequency parameter is set to "Low" and the number of captured images when it is set to "High". This setting may be automatically changed by frequency setting processing (described below).

In step S509, the first control unit 223 determines whether the read frequency parameter is a predetermined value. For example, when "Highest" is set as the frequency for the automatic image capturing (YES in step S509), the processing proceeds to step S510. On the other hand, when "Highest" is not set (NO in step S509), the processing proceeds to step S512. The frequency setting "Highest" is automatically selected by the frequency setting processing (described below). In the regular frequency setting performed by the user by using a dedicated application of the smart device 301, the frequency is selected from the "Low", "Middle", and "High" options, as described above. In other words, the frequency is not set to "Highest" in the setting by the user operation.

In step S510, the first control unit 223 determines whether the frequency boost time since the frequency parameter setting "Highest" is started in step S705 (described below) until the setting is restored to the original one has ended. When the frequency boost time has ended (YES in step S510), the processing proceeds to step S511. On the other hand, when the frequency boost time has not ended (NO in step S510), the processing proceeds to step S512.

In step S511, since the frequency boost time has ended, the first control unit 223 restores the frequency parameter to the frequency setting before "Highest" is selected. When a predetermined number or more of images are captured by the automatic image capturing during the frequency boost time, the first control unit 223 determines the current scene as the target scene, and hence may extend the frequency boost time. This processing enables continuing capturing the scene intended by the user.

In step S512, the first control unit 223 determines whether to perform the automatic image capturing.

The determination on the automatic image capturing will be described now. The first control unit 223 determines whether to perform the automatic image capturing by determining whether an importance score exceeds a predetermined value. The importance score refers to a parameter used to determine whether to perform the automatic image capturing, and is different from the importance level used to determine the search area. Points are added to the importance score based on the subject detection state and the passage of time. Assume an example case of design where the automatic image capturing is performed when the importance score exceeds 2,000 points. In this case, the importance score is initially 0 points, and points are added to the importance score based on the passage of time since the automatic image capturing mode is entered. If there is no subject having high priority, for example, the importance score increases with such an increase rate that the importance score reaches 2,000 points in 120 seconds. If 120 seconds have elapsed without a subject having high priority being detected, the importance score reaches 2,000 points by the point addition over the passage of time. Then, the image capturing is performed. When a subject having high priority is detected during the passage of time, 1,000 points are added. Accordingly, in a state where a subject having high priority is detected, the importance score is likely to reach 2,000 points. As a result, the image capturing frequency is likely to increase.

For example, 800 points are added when the smile of a subject is recognized. This smile-based point addition is performed even for a subject not having high priority. While the present exemplary embodiment will be described centering on an example case where the smile-based point addition score is the same regardless of whether the subject has high priority, the present disclosure is not limited thereto. For example, the point addition score for the detection of the smile of a subject having high priority may be higher than that for the detection of the smile of a subject not having high priority. This enables performing image capturing following the user's intention to a further extent. The automatic image capturing is performed when the importance score exceeds 2,000 points by the point addition accompanying facial expression changes of these subjects. Even if the importance score does not exceed 2,000 points by the point addition accompanying facial expression changes, the importance score reaches 2,000 points in a shorter time period by the point addition over the subsequent passage of time.

The present exemplary embodiment will be described centering on an example case of the point addition over the passage of time where points are added so that the importance score reaches 2,000 points in 120 seconds (2,000/120 points are added per second), i.e., points are linearly added with respect to time. However, it is not limited thereto. In a possible example of a point addition method, no points may be added until 110 seconds out of 120 seconds, and 200 points may be added per second in subsequent 10 seconds (from 110 to 120 seconds). Increasing the importance score in this way enables preventing the importance score from reaching the target score regardless of the degree of the priority by the point addition by a facial expression change of a subject. In the case of the point addition method of linearly increasing the importance score over the passage of time, points have been added over the passage of long time. In this case, therefore, the importance score often reaches the target point even by the point addition accompanying a facial expression change to the smile of a subject with low priority, and hence the degree of the priority is comparatively hard to be reflected. On the other hand, in a case of the low point addition accompanying a facial expression change, the timing of a facial expression change may be missed. Since this point addition method needs to be avoided, no points are added until 110 seconds. With this point addition method, no points are added to the subject with low priority until 110 seconds. On the other hand, since 1,000 points are added upon detection of a subject having high priority, 1,000 points are added even if the point addition is not performed over the passage of time until 110 seconds. Thus, when the point addition accompanying a facial expression change is performed, a subject with low priority enables restricting the possibility that the score reaches the point for image capturing in comparison with a subject with high priority, allowing the degree of the priority to function. While the point addition accompanying a facial expression change has been described above, the criterion of the point addition is not limited thereto. Examples of point addition criteria include a case where the voice increases in volume and a case where the amount of gestures and hand gestures increases. To allow the degree of the priority to function for these criteria, a difference in the above-described point addition method only needs to be provided.

Even if the importance score does not exceed 2,000 points by the action of the subject, the image capturing is performed until 120 seconds over the passage of time, and hence there is no possibility that the image capturing is not performed for a certain period of time.

If a subject is detected on the way, the time to start increasing the importance score may be brought earlier out of 120 seconds. More specifically, when a subject having high priority is detected at 60 seconds, for example, 1,000 points are added but the importance score does not exceed 2,000 points. In this case, however, the first control unit 223 may start linearly increasing the importance score at 30 seconds after detection of a subject, instead of adding no points until 110 seconds. Alternatively, the first control unit 223 may start linearly increasing the importance score not at 10 seconds but at 20 seconds before 120 seconds. Increasing the importance score in this way increases the possibility that a subject with high priority is captured, making it easier to implement image capturing following the user's intention.

When the automatic image capturing is performed, the importance score is reset to 0 points. The automatic image capturing is not performed until the importance score exceeds 2,000 points again.

The frequency parameter is used to control the method of increasing the importance score over the passage of time. The frequency parameter is set so that it takes 120 seconds until the automatic image capturing is performed when a subject is not detected in the above-described example. Although the frequency parameter is "Medium" in this example, the first control unit 223 changes the method of increasing the importance score so that the automatic image capturing is performed at 60 seconds in the frequency boosted state (with the frequency parameter "Highest"). In this case, for example, the first control unit 223 may add 2,000/60 points per second or add no points until 55 seconds and add 400 points per second in the remaining 5 seconds until 60 seconds. The advantage of the latter case is as described above. Example designs for other frequency parameters are as follows. When the frequency parameter is "High", the first control unit 223 increases the importance score so that the importance score reaches 2,000 points in 100 seconds. When the frequency parameter is "Low", the first control unit 223 increases the importance score so that the importance score reaches 2,000 points in 240 seconds. When the frequency parameter is "Highest," at least one image is captured in the shortest time (e.g., 60 seconds according to the present exemplary embodiment). Accordingly, increasing the image capturing frequency means increasing the number of images to be captured per unit time by changing the point addition method, and decreasing the image capturing frequency means decreasing the number of images to be captured per unit time by changing the point addition method.

This completes the description of the determination whether to perform the automatic image capturing. When the first control unit 223 determines to perform the automatic image capturing (YES in step S512), the processing proceeds to step S513. On the other hand, when the first control unit 223 determines not to perform the automatic image capturing (NO in step S512), the processing returns to step S501.

In step S513, the first control unit 223 performs the image capturing processing. The image capturing processing includes still image capturing and moving image capturing.

Figure 6:
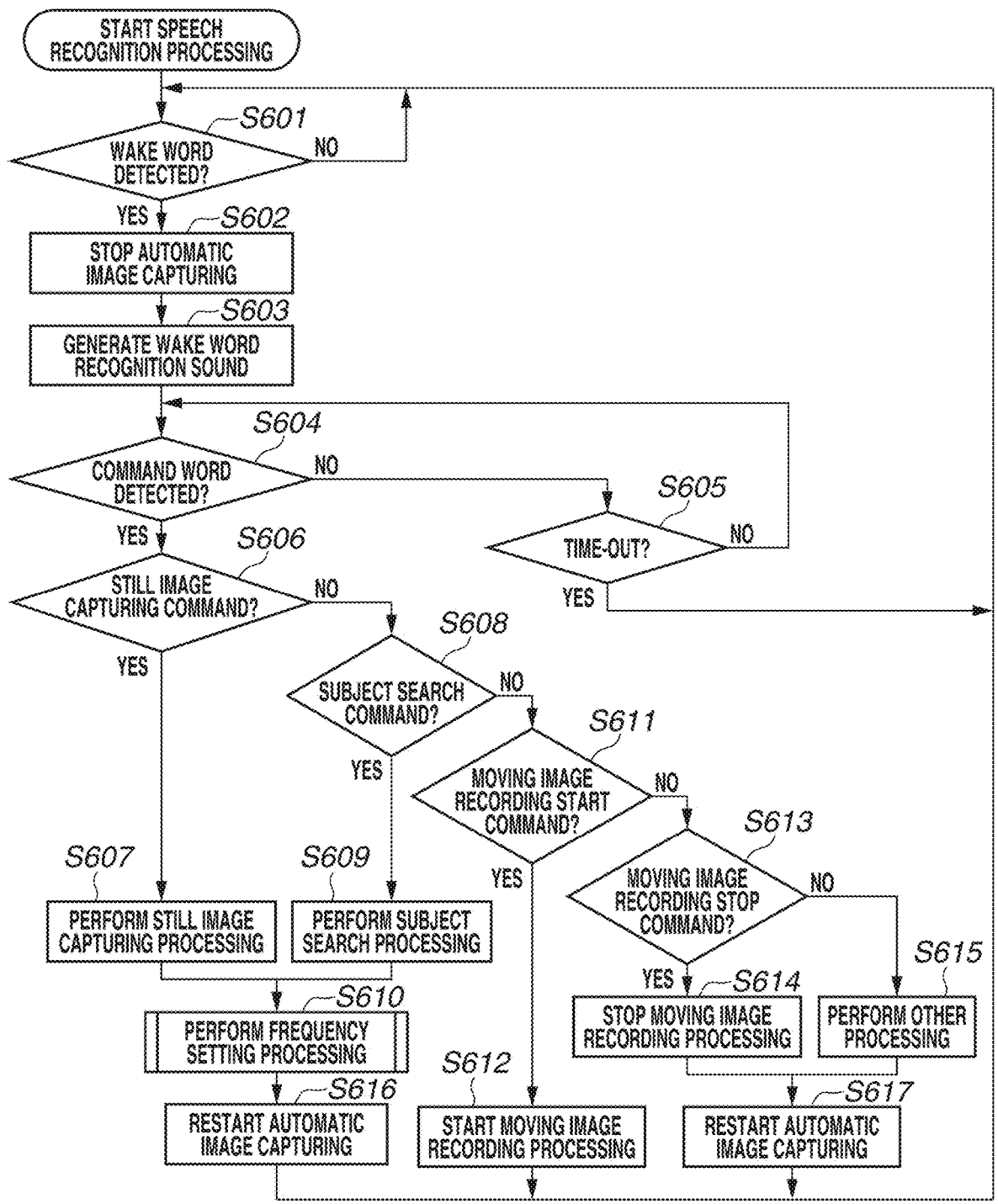
FIG. 6 is a flowchart illustrating speech recognition processing according to one or more aspects of the presently disclosure.

FIG. 6 is a flowchart illustrating the speech recognition processing of the imaging apparatus 101 according to the present exemplary embodiment. When the voice uttered by the user is input to the built-in microphone of the imaging apparatus 101, the audio input/audio processing unit 409 performs the speech recognition processing to acquire a user operation instruction.

In step S601, the first control unit 223 determines whether a wake word is detected. A wake word refers to an activation command for starting audio command recognition for issuing a specific audio instruction to the imaging apparatus 101. When issuing an audio instruction, the first control unit 223 needs to receive a command word after the wake word recognition to succeed in the recognition. When a wake word is detected (YES in step S601), the processing proceeds to step S602. On the other hand, when a wake word is not detected (NO in step S601), the processing repeats step S601 until a wake word is detected.

In step S602, the first control unit 223 stops the automatic image capturing processing. When the first control unit 223 recognizes a wake word, the imaging apparatus 101 enters a command word wait state and stops the automatic image capturing processing. Stopping the automatic image capturing refers to the execution of the subject search and the image capturing processing using the pan/tilt and zoom operations. The purposes of stopping the automatic image capturing include stopping the automatic image capturing and entering the command word wait state to quickly respond to a command word instruction to be given next to the wake word. The purposes of stopping the automatic image capturing also include stopping the pan/tilt operation to enable the image capturing in the direction intended by the user when the user intends to issue an image capturing instruction by using an audio instruction.

In step S603, the first control unit 223 generates a recognition sound to notify the user of successful recognition for the wake word.

In step S604, the first control unit 223 determines whether a command word is detected. When a command word is detected (YES in step S604), the processing proceeds to step S606. On the other hand, when a command word is not detected (NO in step S604), the processing proceeds to step S605.

In step S605, the first control unit 223 determines whether a predetermined time period has elapsed since a wake word has been detected and the command word wait state has been entered. When the predetermined time period has elapsed (YES in step S605), the processing returns to step S601. In step S601, the first control unit 223 stops the command word wait state and enters the wake word wait state. On the other hand, when the predetermined time period has not elapsed (NO in step S605), the processing repeats step S604 until a command word is detected.

In step S606, the first control unit 223 determines whether the detected command word is a still image capturing command. This still image capturing command is a command for requesting the imaging apparatus 101 to capture and record one still image. When the first control unit 223 determines that the command word is a still image capturing command (YES in step S606), the processing proceeds to step S607. On the other hand, when the first control unit 223 determines that the command word is not a still image capturing command (NO in step S606), the processing proceeds to step S608.

In step S607, the first control unit 223 performs still image capturing processing. More specifically, the image processing unit 207 converts the signal captured by the imaging unit 206 into a JPEG file, and then the image recording unit 208 records the JPEG file in the recording medium 221.

In step S608, the first control unit 223 determines whether the detected command word is a subject search command. When the first control unit 223 determines that the command word is a subject search command (YES in step S608), the processing proceeds to step S609. On the other hand, when the first control unit 223 determines that the command word is not a subject search command (NO in step S608), the processing proceeds to step S611.

In step S609, the first control unit 223 performs the subject search processing. If the search target area has already been determined by the subject search processing in step S505, and a subject has already been caught by the pan/tilt drive in step S506 and the zoom drive in step S507, the first control unit 223 stops tracking the subject and performs the subject search processing to search for other subjects. If the user issues a subject search instruction in a state where the subject is caught, the instruction means that there is another target subject in addition to the currently captured one.

After completion of the processing in steps S607 to S609, then in step S610, the first control unit 223 performs the frequency setting processing. The frequency setting processing refers to processing for setting a frequency parameter indicating the number of images to be captured within a predetermined time period. The contents of the processing will be described in detail below. The frequency setting processing in step S610 sets the image capturing frequency to a higher value.

In step S611, the first control unit 223 determines whether the detected command word is a moving image recording start command. The moving image recording start command is a command to request the imaging apparatus 101 to capture and record a moving image. When the first control unit 223 determines that the command word is a moving image recording start command (YES in step S611), the processing proceeds to step S612. On the other hand, when the first control unit 223 determines that the command word is not a moving image recording start command (NO in step S611), the processing proceeds to step S613.

In step S612, the first control unit 223 starts capturing a moving image by using the imaging unit 206 and records the moving image in the recording medium 221. While the moving image is being recorded, the first control unit 223 maintains the automatic image capturing stop state without performing the pan/tilt drive, zoom drive, and subject search.

In step S613, the first control unit 223 determines whether the detected command word is a moving image recording stop command. When the first control unit 223 determines that the command word is a moving image recording stop command (YES in step S613), the processing proceeds to step S614. On the other hand, when the first control unit 223 determines that the command word is not a moving image recording stop command (NO in step S613), the processing proceeds to step S615.

In step S614, the first control unit 223 stops capturing and recording the moving image by using imaging unit 206, and completes the recording of a moving image file in the recording medium 221.

In step S615, the first control unit 223 performs other processing by the audio command. Examples of other processing include processing for the command for performing the pan/tilt operation in the direction specified by the user, and processing for the command for changing various imaging parameters including exposure correction.

In steps S616 and S617, the first control unit 223 performs restart processing for the automatic image capturing stopped in step S602. With this operation, the processing in steps S502 to S510 is enabled, and the automatic image capturing is restarted.

In this case, the frequency setting processing is not performed in a case of the moving image recording start and the moving image recording stop instructions. This is because setting a high frequency is meaningless since the signal from the imaging unit 206 is recorded in succession after the moving image recording is started. After the moving image recording is stopped, the issuing the recording stop instruction by the user indicates that the scene to be recorded has been ended. Therefore, the frequency setting processing is not performed to avoid useless image capturing by needlessly setting a high frequency.

If the battery included in the imaging apparatus 101 has a low remaining capacity or if the temperature of the imaging apparatus 101 reaches a predetermined temperature or higher because of heat generation, it is preferable to prevent the imaging unit 206 from being frequently operated. In such a state, the first control unit 223 may not set the frequency parameter to "Highest" in step S704 in FIG. 7 (described below).

Figure 7:
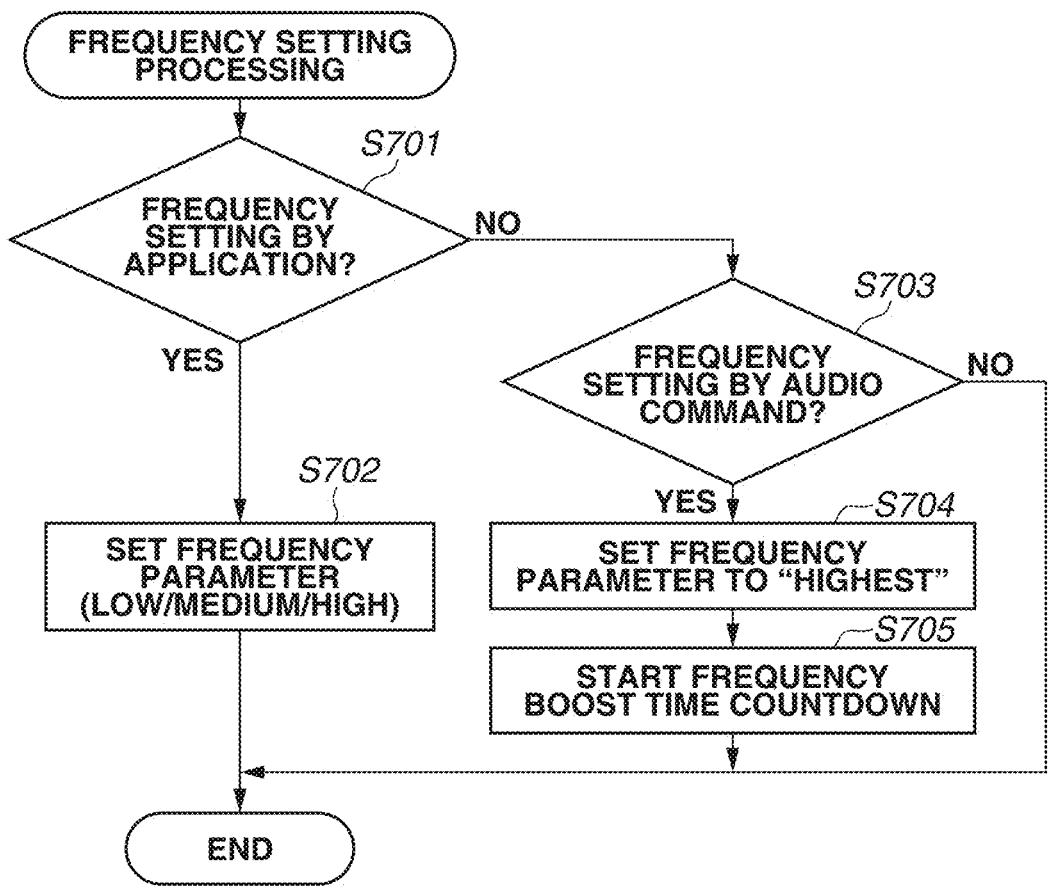
FIG. 7 is a flowchart illustrating frequency setting processing according to one or more aspects of the presently disclosure.

FIG. 7 is a flowchart illustrating the frequency setting processing of the imaging apparatus 101 according to the present exemplary embodiment. As a method of setting the frequency for the automatic image capturing performed by the user, the user may use a dedicated application in the smart device 301. The processing of this flowchart is also started upon execution of step S610 in FIG. 6. The processing is also started when the user issues a frequency change instruction via a dedicated application on the smart device 301.

In step S701, the first control unit 223 determines whether the frequency setting is performed by using a dedicated application on the smart device 301. When the frequency setting is performed by using a dedicated application (YES in step S701), the processing proceeds to step S702. On the other hand, when the frequency setting is not performed by using a dedicated application (e.g., when the frequency setting processing is performed in step S610) (NO in step S701), the processing proceeds to step S703.

Figure 9:
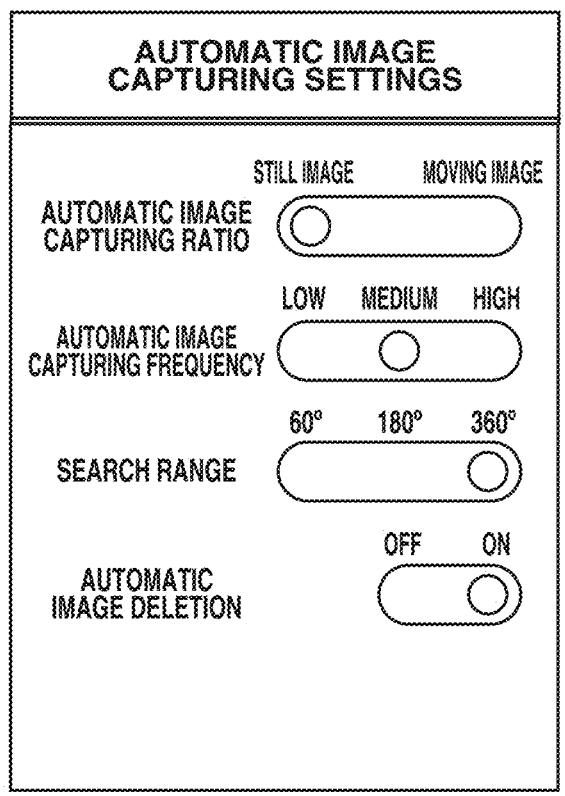
FIG. 9 illustrates an example screen displayed on the external apparatus according to one or more aspects of the presently disclosure.

In step S702, the first control unit 223 sets the frequency parameter specified by the user. For example, the frequency parameter can be set by selecting "Low", "Middle", or "High" from the items of the automatic image capturing frequency in a screen of a dedicated application on the smart device 301 as illustrated in FIG. 9.

Now, the application screen in FIG. 9 will be described.

With a dedicated application of the smart device 301, still and moving images are prepared as the contents to be automatically captured. Further, as the contents to be automatically captured, the user can set which of a still image and a moving image is given priority from a dedicated application. This setting can be changed by touching (flicking) the knob of a slider bar, as illustrated in FIG. 9. When a still image is set to be given priority, the first control unit 223 captures more still images than moving images. When a moving image is set to be given priority, the first control unit 223 captures more moving images than still images.

The user can also set a range subjected to search for the scene to be captured by the imaging apparatus 101 as an angle in degree from the front direction. In the example in FIG. 9, the user can set three different ranges: a range of 60 degrees (30 degrees in each of the rightward and leftward directions from the front direction), a range of 180 degrees (90 degrees in each of the rightward and leftward directions from the front direction), and a range of 360 degrees. A numeric value may be input to enable finer range setting.

When the automatic image capturing is performed, it is concerned that too many contents are captured. Then, a function of automatically deleting images is provided. This function can be turned ON or OFF from the smart device 301. Images subjected to the automatic deletion may be deleted, for example, in ascending order of the date of image capturing or in ascending order of the importance. The importance for a still image, for example, refers to a parameter that numerically estimates whether the image is to be preferably recorded by the user, for example, whether the image is subjected to a small amount of shake or whether the image includes a person. The importance for a moving image, for example, is numerically calculated pending on whether the image includes a person or whether the human voice such as conversations is recorded in the image. The first control unit 223 handles the larger total numeric value as higher importance.

This completes the description of the screen in FIG. 9. FIG. 7 will be described again.

In step S703, the first control unit 223 determines whether the frequency setting is called by the speech recognition processing. When the first control unit 223 determines that the frequency setting is called by the speech recognition processing (YES in step S703), the processing proceeds to step S704. On the other hand, when the first control unit 223 determines that the frequency setting is not called by the speech recognition processing (NO in step S703), the first control unit 223 ends the frequency setting processing.

In step S704, the first control unit 223 sets the frequency parameter to a frequency higher than the frequency that can be set in step S702. This is because the timing when the user issues an image capturing instruction is at least the timing of image capturing desired by the user. More specifically, the scene at the timing when the user issues an image capturing instruction is desired by the user, and hence a scene desired by the user is likely to occur during a close time period. Taking this point into consideration, the imaging apparatus 101 according to the present exemplary embodiment estimates a certain time period since an audio command input (triggered by an audio instruction by a user's audio command) as a scene to be captured, and increases the image capturing frequency. This enables capturing an image desired by the user without missing. Although the present exemplary embodiment has been described above centering on the frequency parameter setting "Highest", it is not limited thereto. The first control unit 223 may increase the frequency in a stepwise manner each time the frequency setting is performed upon issuing an audio command instruction. In this case, the upper limit frequency is determined by the fastest frame speed of the continuous image capturing provided by the imaging apparatus 101.

In step S705, the first control unit 223 sets the frequency boost time as the time period until the frequency parameter set to "Highest" in step S704 is restored to the original parameter, and then starts countdown. Assume an example case where the frequency is set to "Highest" by an audio command instruction when the frequency setting is "Medium". If the frequency boost time is 60 seconds, the frequency setting once set to "Highest" returns to "Medium" in 60 seconds (actual processing is performed in step S511). The frequency boost time in this case refers to the time period during which the "Highest" frequency is maintained. Although the frequency boost time is automatically set, the user may set the frequency boost time to an arbitrary setting time.

In this case, instead of restoring the frequency boost time setting over the passage of a predetermined time period, the first control unit 223 may restore the setting to the original setting depending on whether the predetermined number of images are to be captured by the automatic image capturing.

When the frequency is set to "Highest" again by an audio command before the countdown of the frequency boost time ends, the first control unit 223 extends the predetermined time period until the frequency setting is restored to the original setting or increases the predetermined number of images.

Further, the first control unit 223 may determine whether to restore the frequency setting to the original setting, depending on whether the subject search processing has been omnidirectionally performed in the pan direction.

The above-described exemplary embodiment is based on the use of an audio command as an image capturing instruction from the user. In addition, even when an image capturing instruction is issued via a communication unit from the smart device 301 or a BLE remote control, the first control unit 223 may set the frequency setting to "Highest" after the execution of the instruction. Also, even upon detection of an instruction for performing processing corresponding to a specific vibration pattern using an acceleration sensor in the imaging apparatus 101, the first control unit 223 may set the frequency setting to "Highest" after the execution of the instruction. Further, upon receiving a gesture instruction based on a gesture as a result of analyzing the motion of the user's hands via the imaging unit, the first control unit 223 may set the frequency setting to "Highest" after the execution of the instruction.

The present exemplary embodiment captures an image desired by the user, by tracking a subject through the pan/tilt and the zoom drive. There is assumed a possible implementation in which an omni-directional camera as an imaging unit constantly captures images in all directions, and a required image range is clipped from a captured image to acquire an image of the subject. In this case, the first control unit 223 constantly performs moving image recording and, upon input of a clipping instruction, records a moving image in a still image format, and then increases the frame rate of the moving image. Also, in this case, like the image capturing frequency according to the above-described exemplary embodiment, the first control unit 223 may set the highest settable frame rate or set a value exceeding the settable value. The condition for restoring the increased frame rate may be based on the passage of a predetermined time period, like the above-described exemplary embodiment. This enables the image recording at a higher frequency around the timing desired by the user, and accordingly makes it easier to capture an image, for example, without a focus shake on a moving object.

If the image capturing timing does not come within the frequency boost time, there may be a case where no image is captured. To avoid this, upon reception of a still image capturing command, the first control unit 223 captures an image without performing the pan/tilt drive, zoom drive, and subject search. Subsequently, the first control unit 223 captures three different images in succession while performing the subject search. Then, the first control unit 223 enters the frequency boost state and performs the automatic image capturing for a predetermined time period. Performing operations in this way enables capturing at least four different images when the user intentionally issues a still image capturing instruction by using a still image capturing command, thus avoiding a situation where no image is captured.

Setting Priority

Next, setting of the priority of a subject will be described. The priority according to the present exemplary embodiment refers to a parameter used to preferentially capture an image of a specific person over other persons, by pre-registering information about the specific person in the imaging apparatus 101.

Figure 10A:
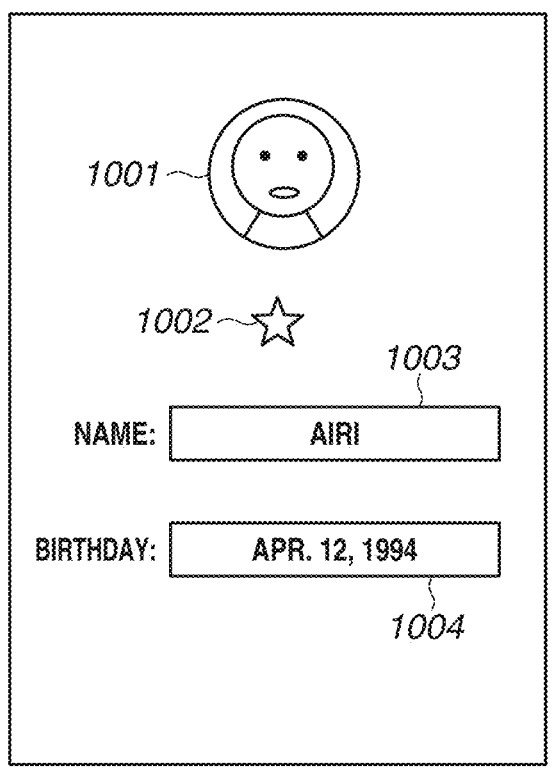
FIGS. 10A and 10B illustrate example screens displayed on the external apparatus according to one or more aspects of the presently disclosure.
Figure 10B:
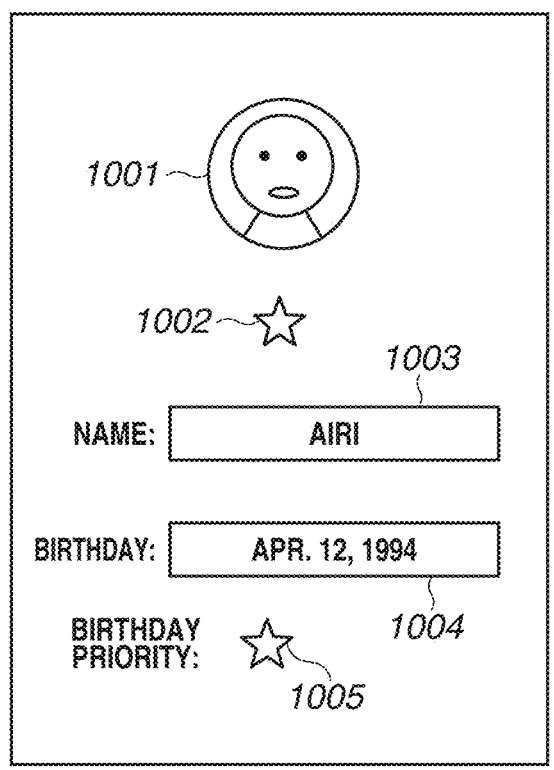

First, a person registration screen out of screens of a dedicated application of the smart device 301 will be described. FIGS. 10A and 10B illustrate examples of the person registration screen displayed on the dedicated application of the smart device 301.

When the imaging apparatus 101 according to the present exemplary embodiment recognizes a person, the first control unit 223 clips the face portion of the person and then transmits the face portion to the smart device 301. If a plurality of persons is recognized, the first control unit 223 clips the face portions of the persons and then transmits these face portions to the smart device 301. The dedicated application of the smart device 301 enumerates the images of the face portion in a graphical user interface (GUI) (not illustrated) regardless of whether the recognized person is pre-registered. When the user selects one of the enumerated face images, the person registration screens illustrated in FIGS. 10A and 10B are displayed.

Referring to the person registration screen in FIG. 10A, a face image 1001 is a face image of a person recognized by the imaging apparatus 101. The screen in FIG. 10A is implemented when the smart device 301 displays the transmitted data. The person registration screen is provided for each of recognized persons. A setting item 1002 is used to turn the priority setting ON or OFF, and displayed as a star sign icon in the example in FIG. 10A. The default setting is the non-priority setting, and the star sign is displayed in gray. When the user touches the setting item 1002, the priority setting is made, and the star sign changes in yellow indicating that the priority setting is ON.

A name display box 1003 is an area for displaying the name of the recognized person. The default display of the name display box 1003 is a blank. When the user selects this area, the name of the person of the face image 1001 can be input. When the user input the name, the person is registered as a registered subject. The data of the subject registered by inputting the name in the name display box 1003 is not automatically deleted. On the other hand, a subject of which the name is not input in the name display box 1003 before a predetermined time period has elapsed is automatically deleted.

A birthday box 1004 is an area for displaying the birthday of the recognized person. The default display of the birthday box 1004 is a blank. When the user selects this area, the birthday of the person of the face image 1001 can be input. For the birthday input, a calendar for date selection may be displayed. When the user selects an arbitrary date from the calendar, the date is input. Alternatively, for example, the user may specify a date by inputting a character string. Although, in FIG. 10A, the date is specified in the month-day-year format, the month-day format is also applicable.

Although the present exemplary embodiment has been described above centering on a method of registering the birthday of the subject as a specific date associated with the registered subject, the specific date associated with the registered subject is not limited to the birthday. Further, a plurality of specific dates associated with the registered subject may be selected for one subject. Further, in addition to a date that comes every year, such as the birthday, a single event such as an entrance ceremony and wedding ceremony may be set as a specific date associated with the registered subject.

The subject information input in this way is transmitted from the smart device 301 to the imaging apparatus 101 via the wireless LAN control unit 401 or the BLE control unit 402. The imaging apparatus 101 records the received subject information in the nonvolatile memory 216.

FIG. 11 schematically illustrates subject information stored in the imaging apparatus 101. "Subject Number" is a number for uniquely identifying the subject. "Priority Setting" records a priority setting of the subject specified by the user in the screen in FIG. 10A. "Name" records a character string specified by the user in the screen in FIG. 10A. "Birthday" records a date specified by the user in the screen in FIG. 10A.

Figure 12:
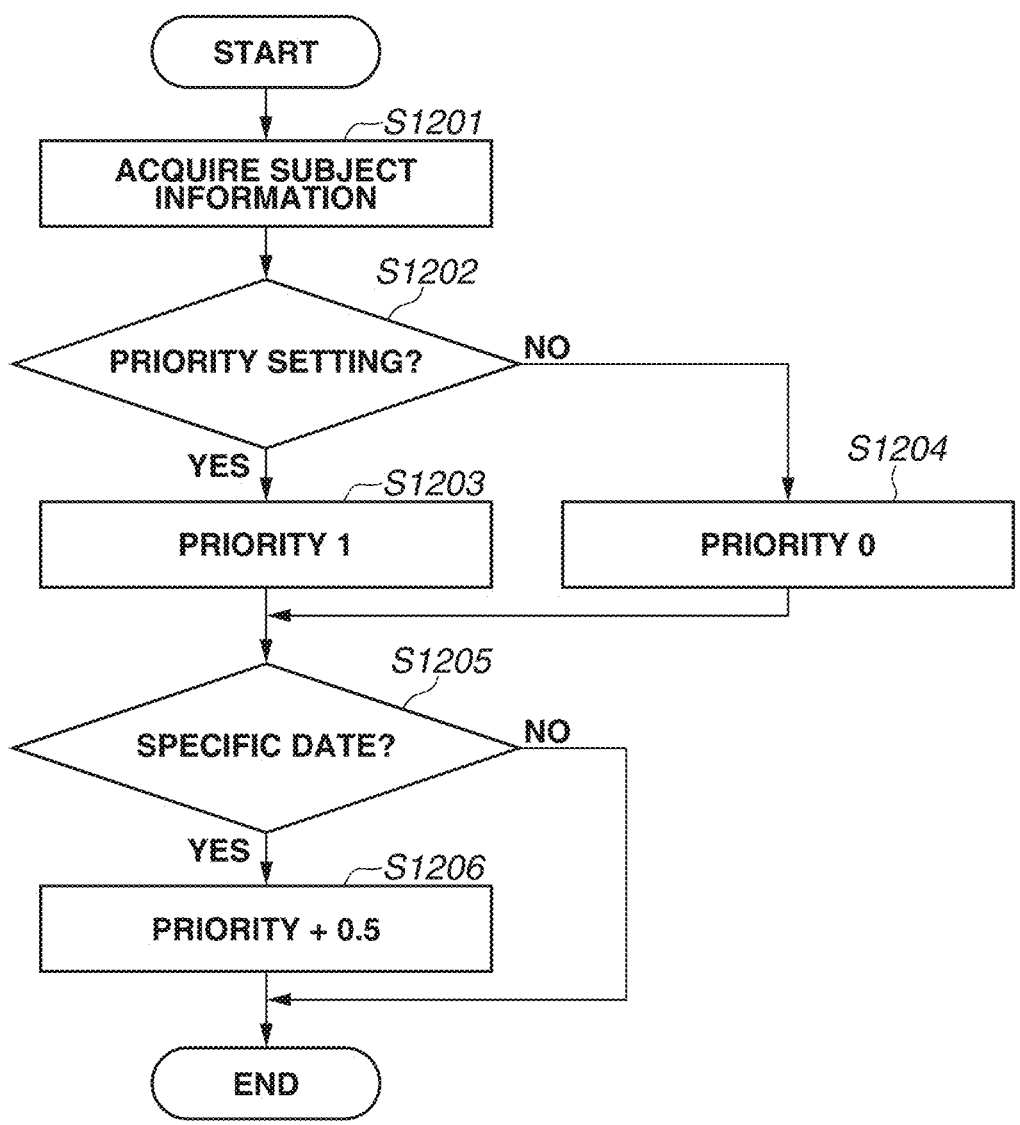
FIG. 12 is a flowchart illustrating processing for setting priority according to one or more aspects of the presently disclosure.

A method for determining the priority of each subject performed by the imaging apparatus 101 will be described with reference to FIG. 12. The flowchart in FIG. 12 is started when the imaging apparatus 101 recognizes a subject in an image acquired in the sequential image capturing.

In step S1201, the first control unit 223 acquires the recognized subject number from the nonvolatile memory 216.

In step S1202, the first control unit 223 confirms the priority setting for each recognized subject number. When the priority setting is ON (YES in step S1202), the processing proceeds to step S1203.

On the other hand, when the priority setting is OFF (NO in step S1202), the processing proceeds to step S1204.

In step S1203, the first control unit 223 sets the priority of the subject as priority 1. In step S1203, the first control unit 223 sets the priority of the subject as priority 0.

In step S1205, the first control unit 223 determines whether the date is a specific date for each recognized subject number. More specifically, the imaging apparatus 101 according to the present exemplary embodiment compares the date of the birthday corresponding to each subject number with the current date based on the subject information table recorded in the nonvolatile memory 216, to determine whether both dates are the same. When both dates are the same, the first control unit 223 determines that the current date is the birthday. More specifically, when the first control unit 223 determines that the current date is a specific date (YES in step S1205), the processing proceeds to step S1206. On the other hand, when the first control unit 223 determines that the current date is not a specific date (NO in step S1205), the processing is ended.

In step S1206, the first control unit 223 adds 0.5 to the priority of the subject.

In the above descriptions, the priority value when the priority setting is made is 1, and the increase amount of the priority by birthday is 0.5. When the increase amount of the priority by birthday is made smaller than the priority setting value by the priority setting, the first control unit 223 maintains a state where the subject under the priority setting by the user is given priority over the subject with which today is the birthday. However, the priority value to be set is not limited thereto. For example, when the priority setting value by the priority setting is made equal to the increase amount of the priority by birthday, the first control unit 223 captures the same number of images of the subject under the priority setting by the user and the subject not under the priority setting, with which today is the birthday. When the increase amount of the priority by birthday is made larger than the priority setting value by the priority setting, the first control unit 223 preferentially captures images of the subject with which today is the birthday over the subject under the priority setting by the user. The increase amount of the priority may not be a fixed value. For example, the first control unit 223 may use a value calculated based on other information including the number of registered subjects, the number of subjects in the angle of view, the degree of smile and face orientation of subjects, and the magnitude of the subject's voice. The first control unit 223 may also use a value that varies with time.

Although the present exemplary embodiment has been described above centering on a method of adding the priority, a method of relatively subtracting the priority of other subjects is also applicable.

The priority value does not need to be especially provided in terms of processing. A system may be configured to operate based on a similar priority setting to that according to the present exemplary embodiment as a result of executing a predetermined algorithm.

Next, processing for determining target positions of the lens drive and the lens barrel rotation drive by using the priority calculated in the above-described processing will be described.

The purpose of using the priority in the automatic image capturing is to capture a larger number of images of a more important subject in various ways and in preferable compositions. A possible method for achieving this purpose is to use the priority in subject tracking, control of the number of images to be captured for each subject, subject search, composition adjustment, and determination of the image capturing timing.

First, the use of the priority in subject tracking will be described. Subject tracking refers to an operation to constantly fit a specific subject into the angle of view. More specifically, the first control unit 223 controls the tilt rotation unit 104 and the pan rotation unit 105 to keep the orientation of the lens barrel 102 toward the subject. According to the present exemplary embodiment, the first control unit 223 uses the subject priority in determining the tracking target subject. More specifically, the first control unit 223 determines the subject having the highest priority out of subjects detected in the angle of view, as the tracking target.

The first control unit 223 may use information about the control of the number of images to be captured (described below) to determine the tracking target. In this case, the first control unit 223 selects the tracking target in consideration of the subject priority and the previous number of images captured for each subject.

Figure 13:
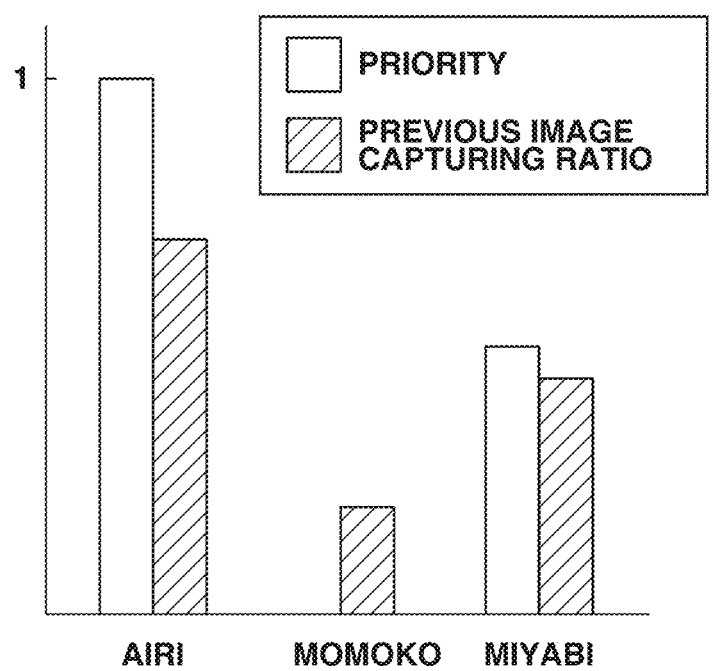
FIG. 13 is a graph illustrating control related to a ratio of the number of captured images according to one or more aspects of the presently disclosure.

Next, the use of the priority in controlling the number of images to be captured will be described with reference to FIG. 13. The first control unit 223 determines the image capturing target subject by using the ratio of the priority of each subject as a target value of the ratio of the number of images to be captured. The first control unit 223 compares the ratio of each subject included in the previously captured images stored in the recording medium 221 with the priority of each subject, and recognizes the subject having the least ratio of image capturing to the target value, as the image capturing target. When the determined image capturing target subject exists in the angle of view, the first control unit 223 captures an image after performing composition adjustment (described below). Although this example uses the ratio of the subject to all of the past images, the present disclosure is not limited thereto. Examples of other methods include a method of using the ratio of subjects captured in the latest 100 times of image capturing, a method of using the latest information, and a method of using the ratio of image capturing on the current day.

Other applicable methods also include a method of sequentially capturing an image for each priority in addition to a method of using the ratio of subjects captured in the past. For example, when a subject A having priority 1 and a subject B having priority 0.5 exist, a certain method changes the image capturing target subject so that the subject A is captured twice and then the subject B is captured once.

Next, the use of the priority in the composition adjustment will be described. In one method, the first control unit 223 adjusts the angle of view to obtain a better composition during the time period between the tracking of the image capturing target subject until the image capturing. First, to mainly capture subjects having high priority, the first control unit 223 performs pan control and tilt control to grasp the subject having the highest priority out of subjects in the angle of view, at the image center. In another method, the first control unit 223 may calculate the center of gravity of the priority of the subjects in the angle of view, and then grasp the position of the center of gravity at the image center. The first control unit 223 may switch between the two methods. Then, in the focus adjustment, the first control unit 223 focuses the subject having the highest priority out of subjects in the angle of view. Then, to adjust the size of the subject in the angle of view, the first control unit 223 adjusts the zoom position to achieve a preferable size of the subject having the highest priority out of subjects in the angle of view. Examples of applicable methods of adjusting the size of the subject include a method of using the face size, a method of using the body size, and a method of using the size of a part of the body. Examples of applicable methods for adjusting the composition when many subjects exist inside and outside the angle of view include a method of adjusting the orientation and zoom position of the camera to maximize the total priority value of subjects included in the angle of view.

Next, the use of the priority in the image capturing timing will be described. The image capturing timing is determined based on the importance score. The algorithm for determining the importance score has been described in the description of the determination of whether to perform the automatic image capturing in step S512 in FIG. 5. The algorithm adds points when a subject having the high priority exists in the angle of view. The present exemplary embodiment assumes three different priority patterns: 0, 0.5, and 1. For example, the algorithm adds 0 points for priority 0, adds 500 points for priority 0.5, adds 1,000 points for priority 1, and adds 1,500 points for priority 1.5. In this way, the first control unit 223 differentiates the likelihood of reaching 2,000 points of the importance score depending on the priority. As a result, the image capturing frequency increases in order of the priority.

In the above-described example, the priority based on the birthday is automatically changed if the birthday is set in the screen in FIG. 10A. For example, in addition to the birthday input, the user may be able to select whether to change the priority based on the birthday. For example, a person registration screen illustrated in FIG. 10B is displayed. This screen includes, in addition to the screen in FIG. 10A, a birthday priority setting item 1005 for turning the birthday priority setting ON or OFF. The default setting is the non-birthday-priority setting, and the star sign is displayed in gray. In this state, the priority remains unchanged even if the birthday has been input. When the user touches the birthday priority setting item 1005, the birthday priority setting is made, and the star sign changes in yellow indicating that the birthday priority setting is ON. To implement this processing, a step for determining whether the birthday priority setting is made is provided before step S1205 in the processing in FIG. 12. When the first control unit 223 determines that the birthday priority setting is made (YES in step S1205), the processing proceeds to step S1206. On the other hand, when the first control unit 223 determines that the birthday priority setting is not made (NO in step S1205), the processing is ended.

According to the present exemplary embodiment, the first control unit 223 automatically changes the priority of a subject based on date and time information associated with the subject in a system including the imaging apparatus 101 and the smart device 301. This enables implementing the automatic image capturing following the user's intention to a further extent.

A second exemplary embodiment will be described centering on an imaging apparatus capable of selecting whether to add the priority for a specific date for each subject, and an imaging apparatus capable of setting the increase amount of the subject priority on a specific date, in a multi-step way. The system configuration according to the second exemplary embodiment is similar to that according to the first exemplary embodiment, and the redundant description thereof will be omitted. The second exemplary embodiment will be described centering on differences from the first exemplary embodiment.

Figure 14:
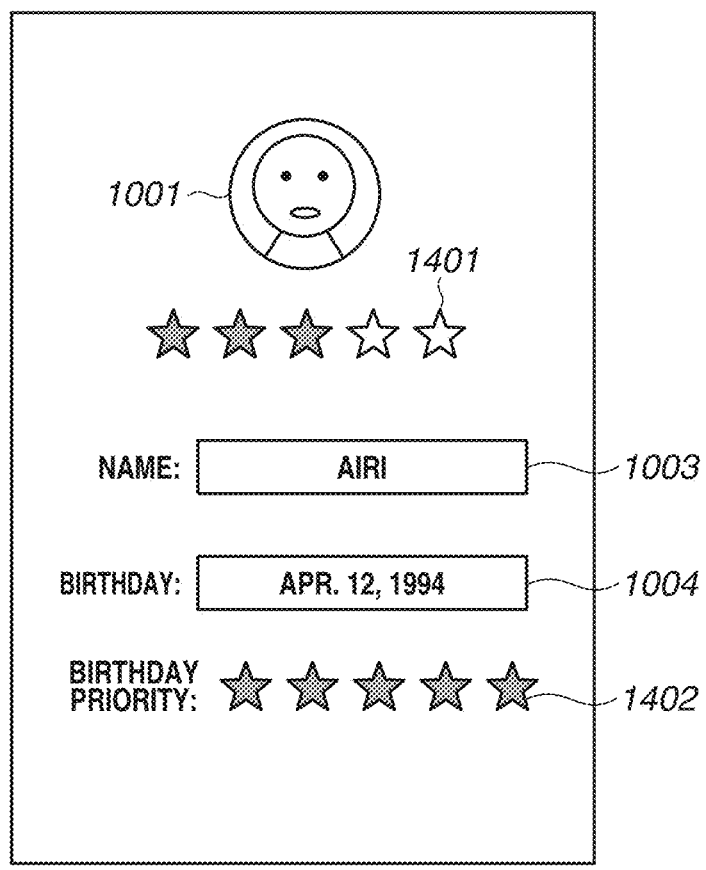
FIG. 14 illustrates an example screen displayed on an external apparatus according to one or more aspects of the presently disclosure.

FIG. 14 illustrates a person registration screen according to the present exemplary embodiment. This screen is displayed in a similar way to that according to the first exemplary embodiment. Areas identical to those in the screens in FIGS. 10A and 10B are assigned the same reference numerals. Unlike the screens in FIGS. 10A and 10B, the screen in FIG. 14 displays an item 1401 for changing the priority setting in a stepwise manner and an item 1402 for changing the birthday priority setting in a stepwise manner. The items 1401 and 1402 are expressed by five star signs arranged in a row. Each time the user touches each item, the priority setting changes in a stepwise manner. The default setting is priority setting OFF. Touching each item increases the priority setting by one step. When the user touches each item when the upper limit is reached, the setting returns to the default setting. Alternatively, the setting may be changed in steps corresponding to the position of the touched item. In the example in FIG. 14, the priority setting changes in 3 steps and the birthday priority setting in 5 steps. In this way, the current step setting is displayed by changing the color of the star signs corresponding to each step setting.

According to the present exemplary embodiment, the star signs are assigned priority settings 0.2, 0.4, 0.6, 0.8, and 1.0 from left to right. More specifically, in step S1203 in FIG. 12, the first control unit 223 sets a priority corresponding to the set step instead of setting the priority to 1. In step S1206 in FIG. 12, the first control unit 223 adds the priority corresponding to the set step instead of adding 0.5 to the priority.

Although five steps are used in the above-described example, the present disclosure is not limited thereto. The number of steps may be different between the priority setting and the birthday priority setting.

Examples of applicable methods other than the method of using a plurality of star signs include a method for setting a value by using a seek bar or pull-down menu or by entering a numerical value.

Although the present exemplary embodiment has been described above centering on a method of registering the birthday of a subject as a specific date associated with the registered subject, the specific date associated with the registered subject is not necessarily limited to the birthday. Further, a plurality of specific dates associated with the registered subject may be selected for one subject. Further, in addition to a date that comes every year, such as the birthday, a single event such as the entrance ceremony and wedding ceremony may be set as a specific date associated with the registered subject.

By setting the increase amount of the priority in a multi-step way as described above, the user can make finer settings for the image capturing target subject.

A third exemplary embodiment will be described centering on an imaging apparatus capable of setting the increase amount of the priority for each event by using an event including a plurality of subjects as a specific date. The system configuration according to the third exemplary embodiment is similar to that according to the first exemplary embodiment, and the redundant description thereof will be omitted. The third exemplary embodiment will be described centering on differences from the first exemplary embodiment.

Figure 15:
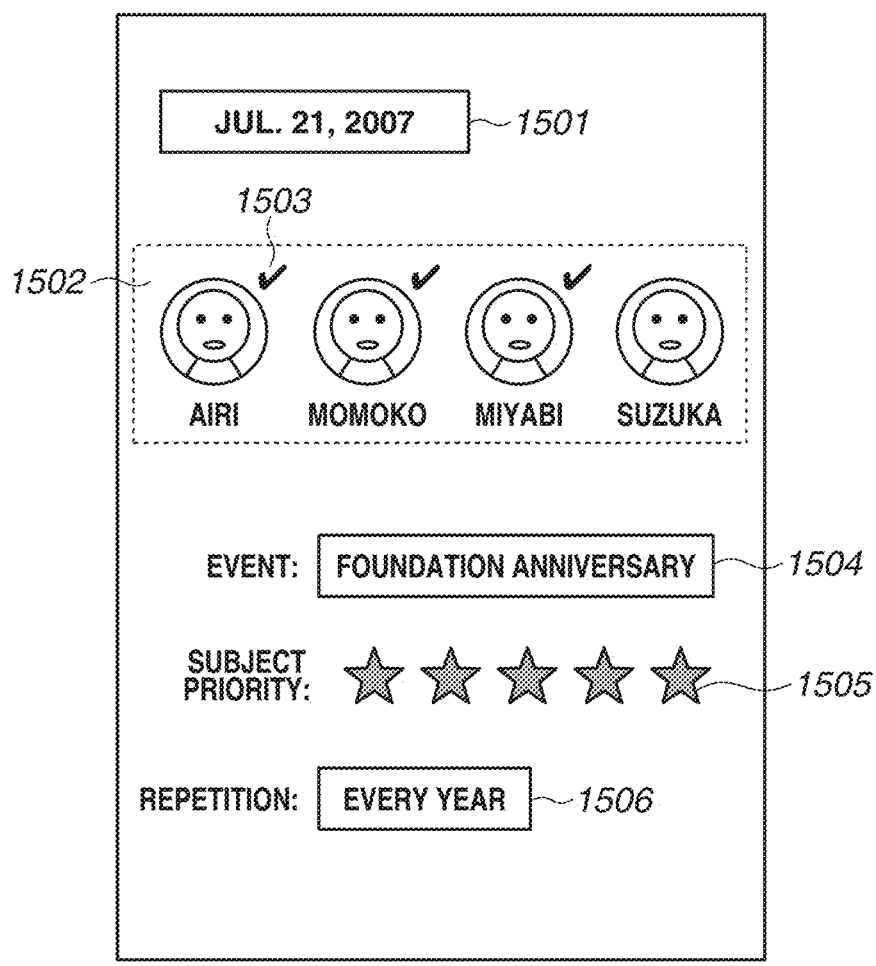
FIG. 15 illustrates an example screen displayed on an external apparatus according to one or more aspects of the presently disclosure.

FIG. 15 illustrates an event setting screen as a screen of a dedicated application of the smart device 301 according to the present exemplary embodiment. The dedicated application of the smart device 301 displays an item for displaying the event setting screen from the top screen (not illustrated). The user can display the event setting screen by touching this item.

In the event setting screen in FIG. 15, a date setting area 1501 enables the user to set a specific date common to a plurality of registered subjects. The default setting is a blank. When the user selects this area, a calendar for date selection is displayed. When the user selects an arbitrary date from the calendar, the date is input. Although the above-described calendar method is provided as an example of a date selection method, the calendar does not necessarily need to be used. For example, a date specification through character string input may be used. Although the date is specified in the month-day-year format in FIG. 15, the month-day format is also applicable. Further, the specific date is not limited to one day, and a plurality of days may be set. For example, a user interface for setting the start and the end dates may be provided.

A registered subject selection area 1502 displays a list of registered subjects by using icons. This area provides the user with a function of setting a subject as a participant of the event upon pressing the icon of the subject. A selection status display icon 1503 is displayed as the icon of the subject registered as a participant of the event, to indicate that the subject is a participant of the event. When the user presses the icon of the subject again where the selection status display icon 1503 is displayed, the subject is removed from the participants of the event. By deleting the selection status display icon 1503, the first control unit 223 notifies the user that the subject is not a participant of the event.

A specific date name setting area 1504 provides the user with a function of arbitrarily setting the name of the event set in the event setting screen. When the user presses the specific date name setting area 1504, an arbitrary character string can be input.

A priority setting area 1505 of the subject associated with the specific date provides the user with a function of presetting the priority on the event date for the subject participating in the event registered in the event screen. The priority setting area 1105 of the subject associated with the specific date is similar to the priority setting item and the birthday priority setting item according to the second exemplary embodiment except that the set priority is applied to all of the subjects participating in the event.

A specified date repetition setting area 1506 provides the user with a function of repeatedly applying this event. When the user presses the specific date repetition setting area 1506, a repetition pattern can be selected. Examples of selectable setting items include Every Year, Every Month, Every Week, Every day, and Once Every Two Weeks. In addition, no repetition can be selected.

When a plurality of subjects is registered as participants in the event setting screen according to the third exemplary embodiment, the image capturing can be performed only when a plurality of the subjects is included in the angle of view. This processing enables preferentially recording the status of communication between event participants.

Examples of applicable methods of determining the subject priority on the specific date include a method of enabling the priority addition only when a plurality of the subjects is included in the angle of view. This processing enables preventing the search and composition adjustment from being affected in a state where a single event participant is captured.

A user interface for grouping one or a plurality of subjects may be provided to enable specifying a group in selecting participant subjects at the time of event registration. Further, an arbitrary group name may be given to each group.

Examples of events to be registered include the birthday, wedding anniversary, foundation anniversary, entrance ceremony, graduation ceremony, wedding ceremony, house party, drinking unity, athletic meet, and trip. However, it is not limited thereto and any event can be registered.

As described above, the present exemplary embodiment makes it possible to provide the user with a method for setting the increase amount of the priority for each specific date in a function of automatically changing the priority of a subject depending on the date and time information associated with the subject. The present exemplary embodiment also makes it possible to provide the user with a method for setting a specific date common to a plurality of registered subjects in the function of automatically changing the priority of a subject depending on the date and time information associated with the subject.

A fourth exemplary embodiment will be described centering on an imaging apparatus that increases the priority of a subject not only on a specific date but also on several days including before and after the specific date. The system configuration according to the fourth exemplary embodiment is similar to that according to the first exemplary embodiment, and the redundant description thereof will be omitted. The fourth exemplary embodiment will be described centering on differences from the first exemplary embodiment.

The above-described exemplary embodiments are based on a method for adding the priority of a subject on a specific date. The fourth exemplary embodiment will be described centering on a method for adding the priority of a subject not only on a specific date but also on several days including before and after the specific date.

For example, if the birthday of a certain subject is a weekday, a birthday party may be generally held on the nearby weekend. Accordingly, the first control unit 223 can provide a function of preferentially capturing an image of the subject even if the birthday party is held on other than the specific date, by adding the priority of the subject onto three days before and after the specific date. The number of days including before and after the specific date is not limited to three. The number of days may be different between before and after the specific date. For example, the first control unit 223 may add the priority onto two days before the specific date and onto five days after the specific date.

The amount of the priority addition onto the specific date is not necessarily the same as the amount of the priority addition between before and after the specific date. Examples of applicable methods include a method for reducing the amount of the priority addition with increasing separation from the specific date, and a method for adding the priority only onto the nearest holiday.

As described above, the present exemplary embodiment makes it possible to provide the user with a method for adding the priority of a subject not only onto a specific date but also onto several days before and after the specific date in the function of automatically changing the priority of a subject depending on the date and time information associated with the subject.

A fifth exemplary embodiment will be described centering on an imaging apparatus that notifies the user that the priority of a subject for a specific date has been changed. The system configuration according to the fifth exemplary embodiment is similar to that according to the first exemplary embodiment, and the redundant description thereof will be omitted. The fifth exemplary embodiment will be described centering on differences from the first exemplary embodiment.

Figure 16A:
FIGS. 16A and 16B illustrate example screens displayed on an external apparatus according to one or more aspects of the presently disclosure.

FIG. 16A illustrates a notification 1601 to be displayed when the priority according to the above-described exemplary embodiments has been changed.

The notification 1601 is displayed on the screen of the smart device 301. This message includes an image 1602 of a subject with the priority changed and a message 1603 notifying that the priority has been changed.

When a dedicated application is activated on the smart device 301, the notification 1601 is displayed in the application. On the other hand, when no dedicated application is activated, the notification 1601 is displayed in the notification area provided by the operating system of the smart device 301. For example, if the smart device 301 is a smart phone mounting the Android or iOS operating system, the notification 1601 is displayed in the notification area provided by the operating system.

According to the present exemplary embodiment, after changing the priority of the subject, the first control unit 223 issues the notification 1601 at a timing when the subject is captured for the first time.

Figure 16B:
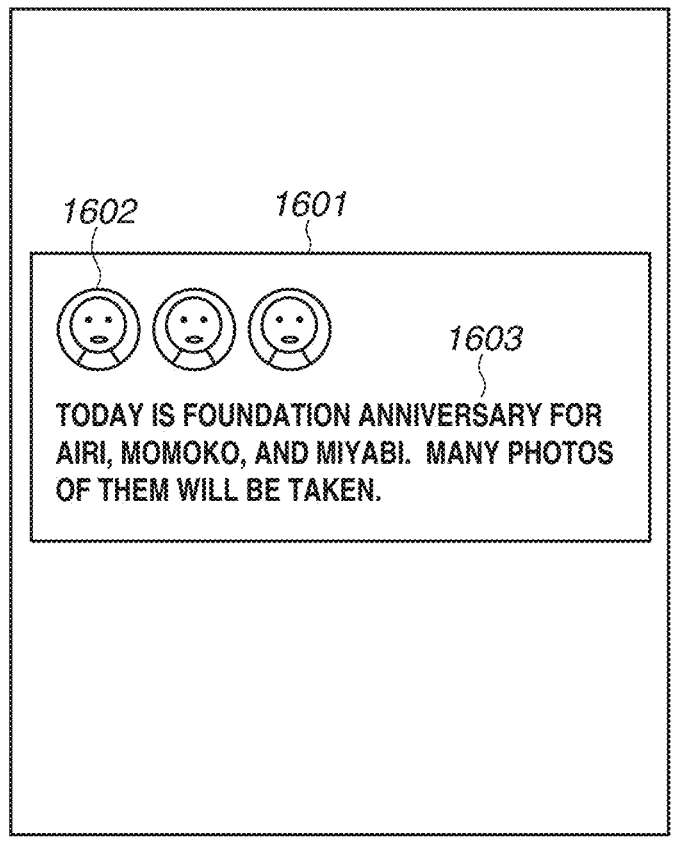

The first control unit 223 may change the display contents of the notification 1601 based on the number of notification target subjects. FIG. 16B illustrates a case where there is a plurality of notification target subjects (three subjects in this case). The message 1603 includes a name of the notification target subject ("Airi" in FIG. 16A) and an event name on the specific date ("Birthday" in FIG. 16A) recorded in the subject information. The message 1603 also includes a word indicating how the priority has been changed ("Many" in FIG. 16A). The word "Many" expressing how the priority has been changed may be replaced by another suitable word expressing the quantity, such as "Moderately" and "Modestly", depending on the priority change state.

The notification 1601 is provided as a press button having a function of displaying a screen of a list of photos including the notification target subject, when pressed.

Although, in the present exemplary embodiment, the image for subject detection stored in the subject information is used as the image 1602 of the subject, the image for subject detection does not necessarily need to be used. Examples of applicable methods include a method of displaying an image including the subject stored in the recording medium and a method of not displaying the image 1602 of the subject. In a case of a plurality of notification target subjects as illustrated in FIG. 16B, the first control unit 223 may display one image including the notification target subjects or display a plurality of images including the notification target subjects.

Although, in the present exemplary embodiment, the name of the notification target subject is included in the message 1603, the name of the subject does not necessarily need to be included therein. However, in a system that registers and captures a plurality of subjects as in the present exemplary embodiment, it is desirable to display the message 1603 so that the user can recognize which subject the notification is for. This does not apply to a system that registers and captures only one subject. In a case of a notification for a group given a group name according to the third exemplary embodiment, the group name may be used instead of the subject name.

Although the notification 1601 is issued after the priority is changed and the image capturing is once performed, the present disclosure is not limited thereto. Examples of applicable methods include a method of issuing the notification 1601 immediately after a subject information detection unit detects the subject, a method of issuing the notification 1601 when the current day is determined to be the event date even without detecting a subject, and a method of issuing the notification 1601 when a specific time on the event date comes.

The present exemplary embodiment enables the user to easily recognize that the priority of the subject has been changed by the function of automatically changing the priority of a subject based on the date and time information associated with the subject.

A sixth exemplary embodiment will be described centering on an imaging apparatus that makes an inquiry to the user about whether to change the priority upon detection of a subject on a specific date. The system configuration according to the sixth exemplary embodiment is similar to that according to the first exemplary embodiment, and the redundant description thereof will be omitted. The sixth exemplary embodiment will be described centering on differences from the first exemplary embodiment.

Figure 17A:
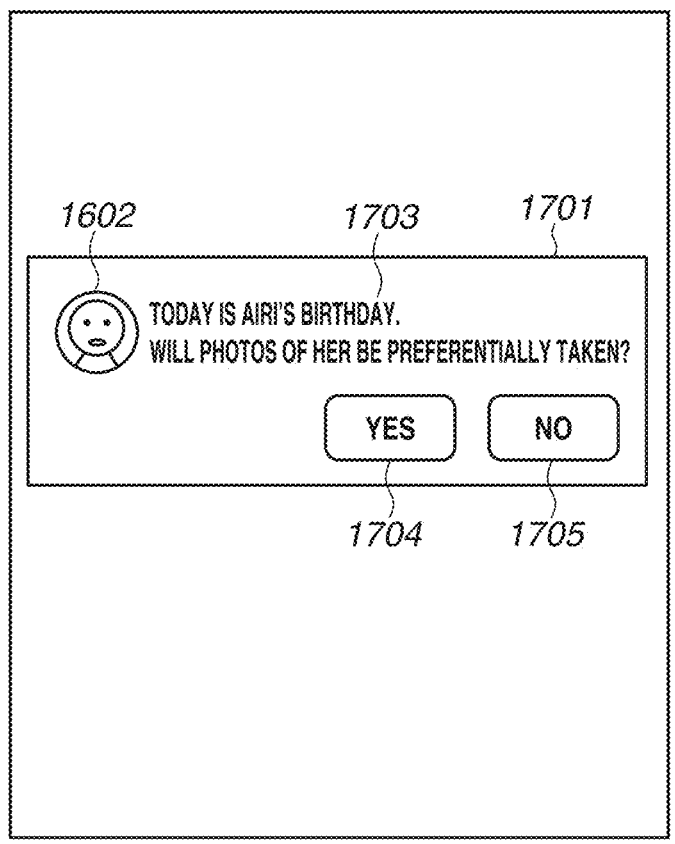
FIGS. 17A and 17B illustrate example screens displayed on an external apparatus according to one or more aspects of the presently disclosure.
Figure 17B:
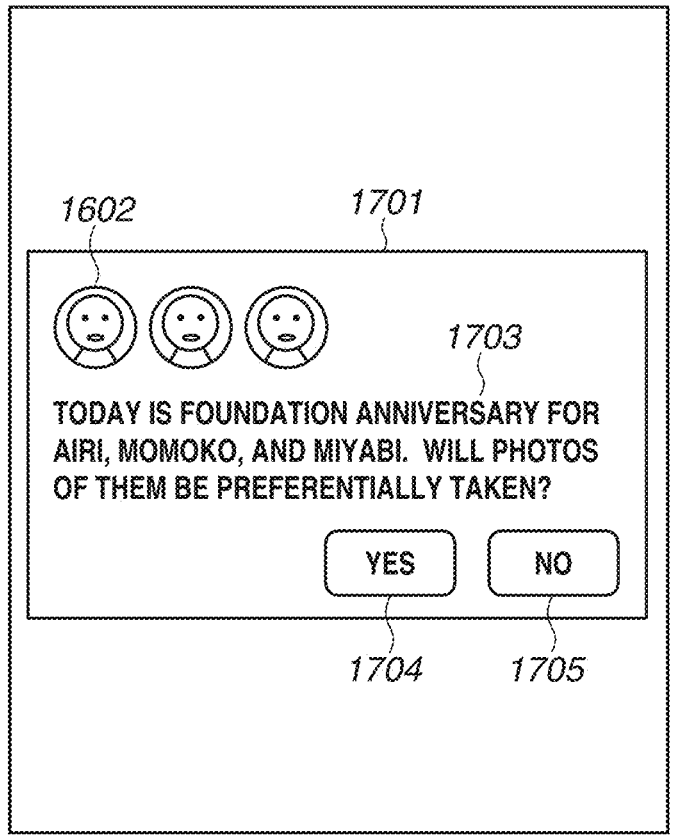

FIGS. 17A and 17B illustrate a notification 1701 for making an inquiry to the user about whether to change the priority when changing the priority of a subject according to the above-described exemplary embodiments.

The notification 1701 includes the image 1602 of the subject, a message 1703, an approval (YES) button 1704 for approving the contents of the message 1703, and a denial (NO) button 1705 for denying the contents of the message 1703.

The image 1602 of the subject is similar to that according to the fifth exemplary embodiment, and the redundant description thereof will be omitted.

The message 1703 includes words for confirming whether to preferentially take photos of the subject. The approval button 1704 and the denial button 1705 can be pressed by the user. When the user presses the approval button 1704, the first control unit 223 changes the priority of the subject based on the method according to the above-described exemplary embodiments to preferentially take photos of the subject. When the user presses the denial button 1705, the first control unit 223 leaves the priority of the subject unchanged and continues the image capturing based on the preset imaging condition.

Although, in the present exemplary embodiment, the notification 1701 is displayed through a similar mechanism to that for the notification 1601 according to the fifth exemplary embodiment, the notification 1701 may be displayed, for example, through a dialog box.

In addition, together with the issuance of a notification, the imaging apparatus 101 or the smart device 301 may produce sound, light, or vibration to notify the user of the issuance of the notification.

When the user presses the approval button 1704 or the denial button 1705, a new notification may be issued in response to pressing the button. For example, when the user presses the approval button 1704, a notification like "OK. Many Photos Of Airi Will Be Taken" can be issued. When the user presses the denial button 1705, a notification like "OK. Photos Of Airi Will Be Taken As Usual" can be issued.

The present exemplary embodiment enables the user to select whether to change the priority of a subject before the priority of the subject is automatically changed based on the date and time information associated with the subject.

Other Exemplary Embodiments

The present disclosure can also be achieved when a program for implementing at least one of the functions according to the above-described exemplary embodiments is supplied to a system or apparatus via a network or storage medium, and at least one processor in a computer of the system or apparatus reads and executes the program. Further, the present disclosure can also be achieved by a circuit (e.g., an application specific integrated circuit (ASIC)) for implementing at least one function.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-160151, filed Sep. 24, 2020, which is hereby incorporated by reference herein in its entirety.

What is claimed is:

1. An imaging apparatus comprising:
an imaging unit; and
a control unit configured to control the imaging unit to automatically capture an image;
wherein the control unit registers a subject;
wherein the control unit associates the subject registered by the control unit with a specific date; and
wherein the control unit sets the subject registered by the control unit to be preferentially captured,
wherein the control unit performs control so that a subject registered by the control unit, with which the specific date associated by the control unit is a current day, is to be preferentially captured over a subject with which the specific date associated by the control unit is not the current day or no date is associated by the control unit,
wherein the control unit performs control so that the subject with which the specific date associated by the control unit is the current day is to be preferentially captured over the subject set to be preferentially captured by the control unit, and
wherein the control unit is implemented by a processor.

2. The imaging apparatus according to claim 1,
wherein the control unit performs control so that the subject set to be preferentially captured by the control unit is to be preferentially captured over a subject not set to be preferentially captured by the control unit and with which the specific date associated by the control unit is the current day.

3. The imaging apparatus according to claim 1, wherein the control unit notifies a user of a notification,
wherein, in a case where the subject with which the specific date associated by the control unit is the current day is detected, the control unit notifies the user of the detection.

4. A method for controlling an imaging apparatus having an imaging unit, the method comprising:
controlling the imaging unit to automatically capture an image;
registering a subject;
associating the subject registered by a registration with a specific date; and
setting the registered subject to be preferentially captured,
wherein a subject with which the specific date associated in the associating is a current day is to be preferentially captured over a subject with which the associated date is not the current day or no date is associated, and
wherein the subject with which the specific date associated in the associating is the current day is to be preferentially captured over the subject set to be preferentially captured.

5. The method for controlling the imaging apparatus according to claim 4,
wherein the subject set to be preferentially captured is to be preferentially captured over a subject not set to be preferentially captured and with which the specific date associated in the associating is the current day.

6. The method for controlling the imaging apparatus according to claim 4, wherein, in a case where the subject with which the specific date associated in the associating is the current day is detected, a user is notified of the detection.

7. A non-transitory computer-readable storage medium which stores instructions for causing a computer to execute a method for controlling an imaging apparatus having an imaging unit, the method comprising:
controlling the imaging unit to automatically capture an image;
registering a subject;
associating the subject registered by a registration with a specific date; and
setting the registered subject to be preferentially captured,
wherein a subject with which the specific date associated in the associating is a current day, is to be preferentially captured over a subject with which the associated date is not the current day or no date is associated, and
wherein the subject with which the specific date associated in the associating is the current day is to be preferentially captured over the subject set to be preferentially captured.

* * * * *